United States Patent
Fujita et al.

(10) Patent No.: US 7,695,698 B2
(45) Date of Patent: Apr. 13, 2010

(54) METHOD OF PRODUCING IRON-ARSENIC COMPOUND EXCELLENT IN CRYSTALLINITY

(75) Inventors: Tetsuo Fujita, Akita (JP); Ryoichi Taguchi, Akita (JP)

(73) Assignee: Dowa Metals & Mining Co., Ltd., Tokyo (JP)

( * ) Notice: Subject to any disclaimer, the term of this patent is extended or adjusted under 35 U.S.C. 154(b) by 207 days.

(21) Appl. No.: 11/605,269

(22) Filed: Nov. 29, 2006

(65) Prior Publication Data

US 2008/0075644 A1  Mar. 27, 2008

(30) Foreign Application Priority Data

Sep. 27, 2006 (JP) ............................. 2006-261855

(51) Int. Cl.
  *C01G 28/00* (2006.01)
  *C01G 49/00* (2006.01)
(52) U.S. Cl. ..................... 423/87; 423/138; 423/594.1
(58) Field of Classification Search .............. 423/594.1, 423/87, 138
  See application file for complete search history.

(56) References Cited

U.S. PATENT DOCUMENTS 5,336,421 A * 8/1994 Kurita et al. ............. 252/62.62

FOREIGN PATENT DOCUMENTS

| JP | 54-160590 | | 8/1979 |
|---|---|---|---|
| JP | 2002-219920 | * | 8/2000 |
| JP | 2006-126896 | | 4/2006 |

OTHER PUBLICATIONS

Yamasaki et al. ("A study of hydrothermal disposal of sodium arsenate waste from Ga-As Processing", Journal of Materials Science, 34 (1999) 4017-4022).*
Singhania et al. "Temperature and Seeding Effects on the Precipitation of Scorodite from Sulfate Solutions under Atmospheric Pressure Conditions", Metallurgical and Materials Transactions, 36B, Jun. 2005, 327-333.*

* cited by examiner

*Primary Examiner*—Roy King
*Assistant Examiner*—Rebecca Lee
(74) *Attorney, Agent, or Firm*—Clark & Brody

(57) ABSTRACT

A method of producing an iron-arsenic compound by adding an oxidizing agent to an aqueous solution containing arsenic ions and bivalent iron ions and allowing an iron-arsenic compound precipitation reaction to proceed under stirring of the solution, wherein the precipitation reaction is terminated at a solution pH in the range of 0 to 1. When the arsenic concentration of the pre-reaction solution is 25 g/L or greater, the reaction can be terminated at a solution pH in the range of −0.45 to 1.2. The pH of the pre-reaction solution is preferably greater than 0 and not greater than 2.0. A ferrous sulfate is can be used as the source of the bivalent iron ions. Even when some amount of impurity elements is present in the arsenic-containing solution, the method is nevertheless capable of forming a scorodite compound excellent in crystallinity in the form of a compact compound barely swollen by moisture and the like, i.e., a niron-arsenic compound excellent in filterability.

13 Claims, 10 Drawing Sheets

METHOD OF PRODUCING IRON-ARSENIC COMPOUND EXCELLENT IN CRYSTALLINITY

FIELD OF THE INVENTION

This invention relates to a method for obtaining an iron-arsenic compound excellent in crystallinity by processing an arsenic-containing solution.

BACKGROUND ART

In nonferrous refining, different kinds of refining intermediates occur and raw materials of various forms exist. Although these refining intermediates and raw materials contain valuable metals, they also include arsenic and other environmentally undesirable elements. A method for removing arsenic has been developed that involves combining arsenious acid with iron, calcium or the like and capturing the arsenic present in the solution in the arsenic compound. The arsenic compound is precipitated out and needs to be separated and removed by filtering. The filterability at this time varies greatly with the state of the arsenic compound. When the arsenic compound is gel-like, the filterability is very poor and processing on an industrial scale is difficult. In other words, the state of the produced arsenic compound is a critical factor influencing the productivity of the arsenic removal processing.

The precipitated and removed arsenic compound is either stored or disposed of, and it is important to minimize the amount of arsenic that elutes back out of the compound. Scorodite ($FeAsO_4 \cdot 2H_2O$) is known as a type of arsenic compound with a low amount of arsenic elution. A marked improvement in arsenic removal processing can therefore be expected if scorodite suitable for filtering is formed. However, industrially generated arsenic-containing solutions contain valuable metals and other elements in a multiplicity of forms. No technology has yet been established for forming scorodite from solutions of this type.

Related prior art can be found in JP Sho-54-160590A.

OBJECT OF THE INVENTION

A number of new arsenic fixation methods were developed by the inventors in the course of diverse research efforts. These methods, which are set out in, for example, Japanese Patent Application No. 2006-126896, have made it possible to form from an arsenic-containing solution a scorodite type compound low in arsenic elution. In terms of industrial implementation, however, the methods would benefit from still further improvement. For instance, the arsenic-containing solution subjected to the scorodite-yielding reaction is required to be prepared as a solution with a very high arsenic concentration, which makes pretreatment of the arsenic-containing solution necessary. In fact, however, it is hard to reduce impurities to the very minimum. In particular, even in the case where only arsenic is leached using an NaOH solution and CaO substitution is then effected to remove Na, NaOH adhering to the solids is nevertheless entrained at solid-liquid separation. The practice is therefore to remove the NaOH with a large amount of washing water. Heavy consumption of washing water is undesirable from the viewpoint of resource preservation and economy. On the other hand, when an attempt is made to avoid use of an alkali and conduct the treatment solely on the acid liquid side, control of the arsenic removal reaction becomes difficult and, as a result, scorodite precipitate excellent in crystallinity cannot be formed consistently.

Owing to this situation, a need has been strongly felt for establishment of a method whereby, even when some amount of impurity elements is present in the arsenic-containing solution, the treatment of the solution is nevertheless capable of forming a scorodite compound excellent in crystallinity in the form of a compact compound barely swollen by moisture and the like, i.e., an iron-arsenic compound excellent in filterability. An object of the present invention is to provide such a method.

SUMMARY OF THE INVENTION

The aforesaid object can be achieved by a method of producing an iron-arsenic compound comprising by adding an oxidizing agent to an aqueous solution containing arsenic ions and bivalent iron ions and allowing an iron-arsenic compound precipitation reaction to proceed under stirring of the solution, wherein the precipitation reaction is terminated at a solution pH in the range of 0 to 1.2. At this time, the arsenic concentration of the solution prior to the start of the precipitation reaction (the pre-reaction solution) is preferably 15 g/L (15 grams per liter) or greater. When the arsenic concentration of the pre-reaction solution is 25 g/L or greater, the reaction can be terminated at a solution pH in the range of −0.45 (minus 0.45) to 1.2. The pH of the pre-reaction solution (pre-reaction pH) is preferably in the range of greater than 0 to not greater than 2.0. A sulfate, for example, can be used as the source of the bivalent iron ions. It is permissible for the pre-reaction solution to contain one or more of sodium, potassium, copper, zinc, manganese and magnesium at a total concentration of 1 to 150 g/L. It may be difficult to measure the pH when the temperature of the solution is high (e.g., higher than 60° C.). This problem can be avoided by using the pH value measured for a liquid sample after it has been cooled to a temperature not higher than 60° C.

This invention further provides a method of producing an iron-arsenic compound by adding an oxidizing agent to an aqueous solution containing arsenic ions and bivalent iron ions and precipitating an iron-arsenic compound, which method comprises keeping the pH of the solution before the start of the precipitation reaction (pre-reaction pH) to greater than 0, adding the oxidizing agent to the solution and allowing the precipitation reaction to proceed under stirring of the solution, and controlling the pH to make the final pH of the solution in the stirred state after termination of the precipitation reaction (post-reaction pH) not greater than 1.2. As a method of controlling the post-reaction pH to not greater than 1.2, it is, for example, effective to use a sulfate as the source of the bivalent iron ions and adjust the pre-reaction pH to the range of greater than 0 to not greater than 2.0, preferably 0.5 to 2.0. The arsenic concentration of the pre-reaction solution is preferably 20 g/L or greater. It is permissible for the pre-reaction solution to contain as impurities one or more of, for example, sodium, potassium, copper, zinc, manganese and magnesium, at a total concentration of 1 to 150 g/L.

The present invention enables formation of an iron-arsenic compound from an arsenic-containing solution including impurities. The filterability of the iron-arsenic compound is good enough to enable industrial production. An arsenic precipitation rate of 60% or greater is ensured, while it is possible to achieve precipitation rates of 80% or 95% or even higher by a simple operation of, for example, pH (hydrogen ion index) optimization. In addition, the iron-arsenic compound thoroughly inhibits arsenic elution. The present invention can therefor be utilized to treat industrially generated arsenic-containing solutions.

DESCRIPTION OF THE PREFERRED EMBODIMENTS

The method of the present invention enables formation of an iron-arsenic compound excellent in filterability (e.g., a scorodite type crystalline substance) from an industrially generated arsenic-containing solution, i.e., an arsenic-containing solution including some amount of impurity elements. When impurities are present, the arsenic precipitants tend to be noncrystalline (amorphous) and gel-like, particularly in the case where the arsenic concentration of the treated solution is low. Noncrystalline precipitants are very poor in filterability. In addition, the residue volume is so exceedingly great as to make handling difficult. Arsenic fixation (prevention of elution) is also difficult.

Studies showed that a low pH enables formation of crystalline scorodite even when impurities are present. A pH of 1.2 was found to be the critical pH value determining whether a noncrystalline precipitate is formed or a crystalline scorodite type precipitate is formed. If the solution is thoroughly stirred at a final pH of not greater than 1.2, the noncrystalline precipitate formed in the course of the reaction is once redissolved and then reprecipitated, whereby in the end it is possible to separate and recover an iron-arsenic compound that has excellent crystallinity (that includes very little noncrystalline precipitate and is easy to filter). The process of the noncrystalline precipitate being redissolved and reprecipitatd as crystalline precipitate will sometimes be called the "conversion process" in the following.

When the solution pH is too low, however, the arsenic precipitation rate falls sharply, sometimes to the point that almost no arsenic precipitation occurs. Through a detailed study on this point, the inventors learned that when the solution elevated in temperature at the start of the reaction and in a state immediately preceding the start of the precipitation (sometimes called the "pre-reaction solution" in this specification) is made to have a pH higher than 0, e.g., 0.5 or greater, an arsenic precipitation rate of 60% or greater can be achieved even if the pH decreases with progress of the reaction as mentioned later. From the industrial perspective, a precipitation rate of 80% or higher is desirable. A high arsenic precipitation rate of 80% or greater, or even 95% or greater, can easily be realized because the precipitation rate markedly improves for even a slight increase in the pH of the solution. The precipitation rate more readily improves when the arsenic concentration of the pre-reaction solution is high, e.g., when it is about 25 g/L or about 30 g/L.

The pH during reaction is thus an important factor in the present invention.

Figure 1:
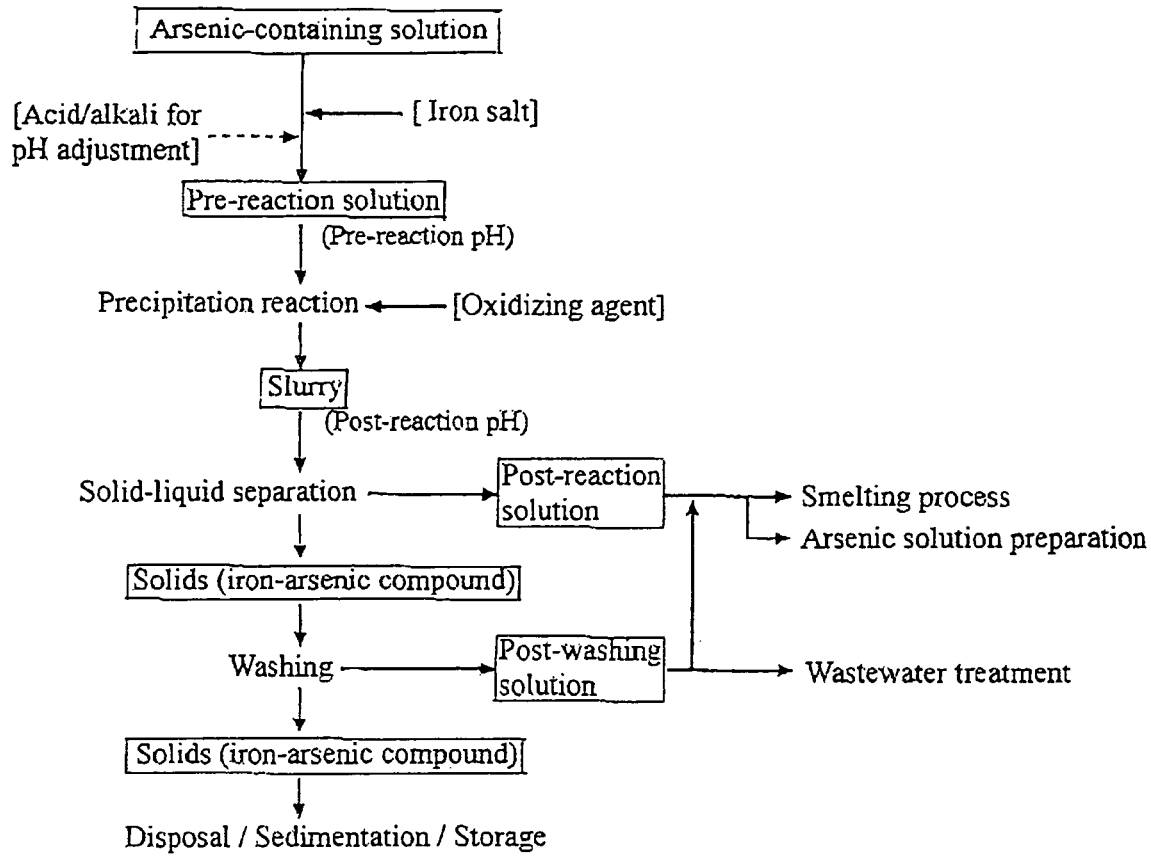
FIG. 1 is a diagram showing a typical treatment flow for obtaining the iron-arsenic compound of the present invention.

FIG. 1 is a diagram showing a typical treatment flow for obtaining the iron-arsenic compound of the present invention.

The method of the present invention will now be explained in detail.

The arsenic-containing solution to be treated can be any of various solutions generated in nonferrous refining and other such processes. The "pre-reaction solution" at the stage of having an iron salt mixed therein as explained later and, if necessary, having undergone pH adjustment, is desirably one than can be made to have an arsenic concentration of 15 g/L or greater, preferably 20 g/L or greater. A higher arsenic concentration improves productivity because it increases the amount of arsenic that can be treated at one time. Moreover, the effectiveness of the treatment can be enhanced by controlling the filtering and continuous processing methods and the amount of other chemical agents added. The arsenic ions are preferably present in the solution as pentavalent ions. In other words, it suffices to make pentavalent arsenic ions present during the reaction and they can be made present by utilizing an oxidation-reduction reaction or some other suitably selected method.

A salt to serve as a supply source of bivalent iron ions is mixed into the arsenic-containing solution (solution for treatment). Although it makes no difference whether the salt is a sulfate, a nitrate or a chloride, a sulfate is superior economically. The iron salt can be mixed in as a liquid or be added to the solution as a solid substance and dissolved therein under heating and stirring. The usual iron salt in the form of a solid substance is, for example, ferrous sulfate 7-hydrate. This substance is produced in large amounts as a byproduct of titanium refining and can advantageously be used as it is. Although the solid iron salt can be mixed into the arsenic-containing solution after being dissolved in water, the arsenic concentration needs to be adjusted in this case taking into account that the addition somewhat lowers the arsenic concentration of the pre-reaction solution. The bivalent iron ions only need to be present during the reaction and the method of adding the bivalent iron ions can be selected as appropriate. In the present invention, the oxidizing agent is added at low pH to react the bivalent iron ions and the pentavalent arsenic ions.

Either the ratio of iron to arsenic is made equal to the molar ratio of scorodite ($FeAsO_4 \cdot 2H_2O$) or iron is made present somewhat in excess. Specifically, the molar ratio of Fe to As is made 0.9 or greater and, from the viewpoint of enhancing process control, is preferably made around (1.5±0.2). However, since the molar ratio may vary depending on how the iron salt is supplied, the ratio of iron to arsenic should be suitably set with consideration to the freeing of iron salt ion decomposition.

The pH of the pre-reaction solution is preferably made not greater than 2.0. Even when the pH is higher than 2.0, the noncrystalline gel can still be converted to crystalline scorodite by the conversion process provided that the pH, which decreases as the reaction progresses, falls to a final value of 1.2 or lower. However, a high pH leads to abundant noncrystalline gel formation that may in some cases make stirring difficult. It is therefor highly effective to make the pre-reaction pH not greater than 2.0. Acid is added as required to adjust the pH. Any among hydrochloric acid, nitric acid and sulfuric acid can be used. In the interest of promoting resource recovery, use of an acid containing the same type of negative ions as the negative ions supplied by the added iron salt is preferable. When a sulfate is used as the iron salt, sulfuric acid is normally used for pH adjustment.

The reaction lowers the pH because the oxidation and precipitation as scorodite ($FeAsO_4 \cdot 2H_2O$) of the iron ion supplied in the form of iron salt is accompanied by a simultaneous hydrolysis reaction. When the iron salt is iron sulfate, for instance, the hydrolysis reaction produces $H_2SO_4$ and this acid lowers the pH. The reaction is expressed by the following Formula (1):

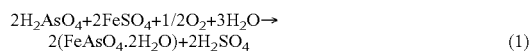

$$2H_3AsO_4 + 2FeSO_4 + 1/2 O_2 + 3H_2O \rightarrow 2(FeAsO_4 \cdot 2H_2O) + 2H_2SO_4 \quad (1)$$

The arsenic concentration of the pre-reaction solution is preferably 15 g/L or greater, more preferably 20 g/L or greater. It also acceptable to adjust the concentration to 25 g/L or greater or 30 g/L or greater if such is possible. A high arsenic concentration effectively improves the precipitation rate at low pH. The arsenic concentration also affects the particle diameter and specific surface area of the precipitate. So an arsenic concentration of 20 g/L or greater is also preferably established in the pre-reaction solution so as to form coarse particles with excellent washability. But the gel (noncrystalline substance) precipitated early in the reaction sometimes congeals the solution when the arsenic concentration is excessive and the pre-reaction pH is between 1.2 and 2. In such a case, thorough stirring and mixing cannot be achieved and the reaction stops despite continued supply of the oxidizing agent, so that the precipitant persists as noncrystalline gel to the end. The arsenic concentration of the pre-reaction solution should therefore be made to fall in the range of not greater than 45 g/L or not greater than 40 g/L.

Iron is required to be present among the metal elements other than arsenic contained in the pre-reaction solution. As pointed out earlier, the iron concentration is preferably made such that the molar ratio of Fe (as bivalent Fe) to As is 0.9 or greater and preferably around 1.5±0.2. Inclusion of various other metal elements is tolerable within a range that they do not impair the effect of the invention. For example, a pre-reaction solution can be adopted that includes one or more of sodium, potassium, copper, zinc, manganese and magnesium at a total concentration of 1 to 150 g/L. Although this does not mean that inclusion of metal elements other than arsenic, iron, sodium, potassium, copper, zinc, manganese and magnesium is intolerable, the content of such metal elements is preferably kept to a very low level (level of unavoidable impurities).

The reaction that forms the compound of iron and arsenic is thought to be a coprecipitation reaction of arsenic with iron. This reaction proceeds mostly above 50° C. In order to control and enlarge the particles, the temperature is preferably made 70° C. or higher, more preferably 90° C. or higher. At temperatures up to 100° C., the reaction can be carried out in an open tank under atmospheric pressure. Alternatively, the reaction can be conducted at a temperature exceeding 100° C. using an autoclave or other sealed heat-resistant container. Reaction in an open-tank system at 100° C. or lower is economically preferable. The optimum temperature should be set taking the pressure of the reaction atmosphere into account.

An oxidizing agent is required for the reaction. Oxygen gas and air are the ordinary choices for the oxidizing agent. However, hydrogen peroxide, ozone, manganese dioxide and diluted oxygen gas are theoretically usable provided that they produce oxygen ions or oxygen molecules in the solution. In addition, the solution must be stirred for the reaction to proceed. Vigorous stirring is preferable because the solution turns into a slurry as the precipitation reaction progresses. The end point of the precipitation reaction can be determined by monitoring the pH behavior. The reaction usually terminates in around one to two hours. However, when oxygen gas or air is used as the oxidizing agent, three or more hours (including ripening time) should be allowed for thoroughly carrying out the crystallization and ripening by use of the conversion process. The ripening time can be shortened by using a strong oxidizing agent like $MnO_2$. Stirring is continued until the ripening is completed. The precipitation reaction should be conducted so that the pH passes through or is held within the range not exceeding 1.2 during the reaction. In the pH range below 1, the state becomes one suitable for the precipitation reaction because the strong acidity inhibits the effect of other impurities. When the oxidizing agent is a gas, the method of addition can be selected between blowing and bubbling and between continuous addition and intermittent addition. A solid oxidizing agent can be added in granular or powder form, and a liquid oxidizing agent can be added in the form of mist or by jetting.

The pH of the post-reaction solution (ripened slurry), i.e., the post-reaction pH as termed in this specification, is required to be not greater than 1.2 as set out in the foregoing. At a higher pH, a large amount of noncrystalline precipitate remains. The post-reaction pH is more preferably not greater than 1.16 and still more preferably not greater than 1.0 or even smaller than 1.0. Although it is acceptable for the post-reaction pH to be 0 or smaller, it is preferably made 0 or greater when the arsenic concentration of the pre-reaction solution is relatively low, e.g., below 25 g/L, so as to ensure an adequate precipitation rate of the iron-arsenic compound. The precipitation rate improves at a higher arsenic concentration of the pre-reaction solution. Therefore, when the arsenic concentration of the pre-reaction solution is, for example, 25 g/L or greater, or particularly when it is 30 g/L or greater, the post-reaction pH can be allowed to decrease to around −0.45 (minus 0.45) but should preferably be kept not lower than −0.40 (minus 0.40).

The post-reaction solution is subjected to solid-liquid separation, which can be effected by any of various methods such as filter pressing, centrifugation and decanting. In the filtrate resulting from the solid-liquid separation there is existing very small amount of unreacted arsenic and iron, as well as acid (e.g., sulfuric acid) produced by hydrolysis. These are reused as a solution containing acid in the refining process. Reuse as a solution for producing arsenic is of course also possible.

Among the solids obtained by the solid-liquid separation, those of elevated arsenic concentration consist of coarse particles low in moisture content and, as such, are excellent in filterability and washability. The solids are washed to remove unreacted solution adhering thereto to some degree. When the washing is performed by using a filter press, belt filter, centrifuge or the like so as to pass additional water through the cake, the adhering water can be efficiently removed with a small amount of water. In the case of performing repulp-washing, effective washing can be realized by adopting the countercurrent method.

The washed solids are made up chiefly of a compound composed of about 30 mass % arsenic, about 30 mass % iron and the remainder of oxygen as oxides and hydrogen. Although the particles are small in diameter when precipitated under a low arsenic concentration condition, a compound consisting of coarse particles (e.g., of an average particle diameter of about 20 μm) can be obtained if the arsenic concentration of the solution is made 15 g/L or greater, preferably 20 g/L or greater, before or in the course of the reaction, and the BET also becomes small (e.g., less than 1.0 m$^2$/g). The iron-arsenic compound is a scorodite type crystal that markedly inhibits arsenic elution, is very low in volume, and is amenable to storage and disposal. In addition, it has potential for use in industrial sectors that utilize arsenic.

EXAMPLES

Example 1

The arsenic starting material was prepared by diluting with pure water an arsenic solution (As=500 g/L (pentavalent)) of a commercially available reagent (Wako Pure Chemical Industries). The iron salt used was ferrous sulfate 7-hydrate reagent (FeSO$_4$.7H$_2$O, Wako Pure Chemical Industries). Na$_2$SO$_4$ reagent (Wako Pure Chemical Industries) was used to simulate an impurity.

The materials were mixed with pure water to prepare 0.7 L of an arsenic-iron containing solution having an arsenic concentration of 50 g/L, iron concentration of 55.91 g/L, and a sodium concentration of 40 g/L. The solution was transferred to a 2 L glass beaker, to which two stirring turbine blade and four baffle plates were set, and vigorously stirred the solution at 1,000 rpm under heating to 95° C. A very small sample of the solution taken at this point was cooled to 60° C. and measured for pH and ORP (oxidation-reduction potential). pH was measured with a glass electrode and ORP with an Ag/AgCl electrode. The pH was 1.25. The sample was returned to the reaction vessel (beaker) after the measurement. No acid was added for pH adjustment. The solution thus constituted a 95° C. pre-reaction solution having a pre-reaction pH of 1.25.

Ninety-nine percent pure oxygen gas was blown into the reaction vessel with the pre-reaction solution maintained at 95° C. under stirring. The flow rate of the oxygen gas was 1.0 L/min. The stirring condition, temperature and gas flow rate were maintained for 7 hours from the start of oxygen gas blowing. During this period, the solution was sampled hourly and measured for pH and ORP. The samples were returned to the reaction vessel. The final pH measured upon lapse 7 hours was defined as the post-reaction pH.

The temperature of the reacted solution (mixed slurry of solution and precipitates) was lowered to 70° C. and then filtered (solid-liquid separated) with a KST-142 pressure filter using Advantec filter paper (0.01 m$^2$ filtration area) from Toyo Roshi Kaisha, Ltd. Filtering was performed using air as the pressurized gas (gauge pressure of 0.4 MPa). The filtration time was measured and used to calculate the filtration velocity per unit area. The filtrate was subjected to acid concentration (FA=Free Acid) measurement by titration and composition analysis. The filtered solids took the form of a wet cake. The wet cake was repulp-washed with pure water for 1 hour at a pulp concentration of 100 g/L and then refiltered. The intensity of the stirring during the repulp-washing was that obtained under conditions of two turbine disk stages, 500 rpm and four baffle plates. The filtering temperature was 30° C. The filter time was approximately the same as in the first filtering.

The washed and filtered solids were dried for 18 hours at 60° C. The weights measured before and after drying were used to calculate moisture content. The dried solids were subjected to composition analysis, elution testing, particle diameter testing using a particle size distribution analyzer, specific surface area measurement by the N$_2$ gas adsorption method (BET method), specific gravity measurement, compressed density measurement, diffraction pattern measurement by XRD, and crystal particle morphology observation with an electron microscope.

Elution testing was done in accordance with Japan Environment Agency Notification No. 13. Specifically, the solids were mixed with pH 5 water at the ratio of 1 to 10, shaken for 6 hours in a shaking machine and then solid-liquid separated, whereafter the composition of the filtered liquid was analyzed.

Particle diameter measurement using a particle size distribution analyzer was done with a LA-500 unit (Horiba, Ltd.).

BET measurement was done by the BET one-point method using a Yuasa Ionics Monosorb.

Specific gravity was determined by Beckman specific gravity measurement.

Compressed density was measured as the bulk density of solids molded under 1 ton of pressure.

X-ray diffraction pattern measurement was done using a Rigaku RINT-2500 diffractometer under conditions of Cu—Kα, x-ray tube voltage of 40 kV, tube current of 300 mA, scanning velocity of 0.01°/sec, scanning angle of 2θ=5° to 85°, and use of a scintillation counter.

Electron microscope observation was done using a Hitachi S-4500 FE-SEM (field emission SEM) with the acceleration voltage set to a low 5 Kv.

The results are shown in Tables 1-4.

Figure 2:
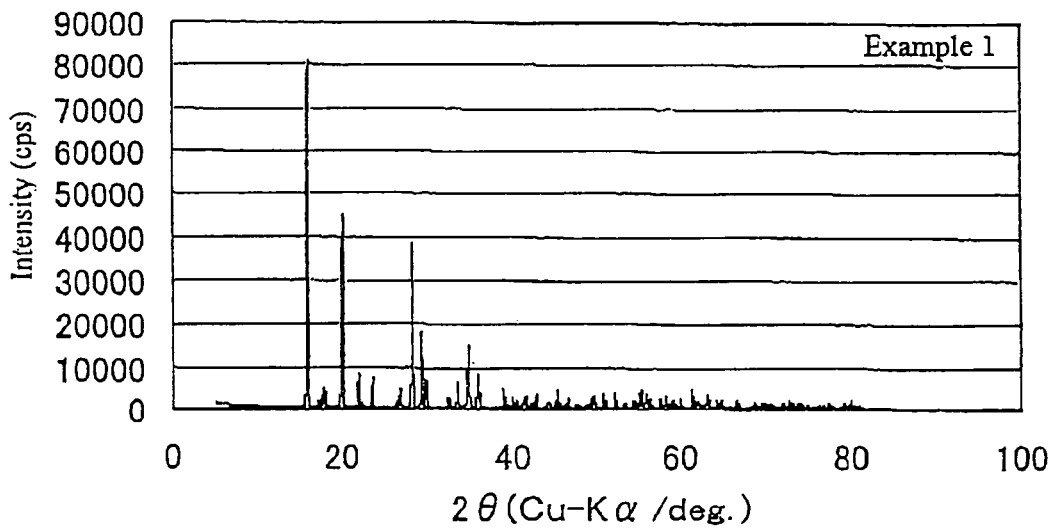
FIG. 2 is the x-ray diffraction pattern of the iron-arsenic compound obtained in Example 1.
Figure 3:
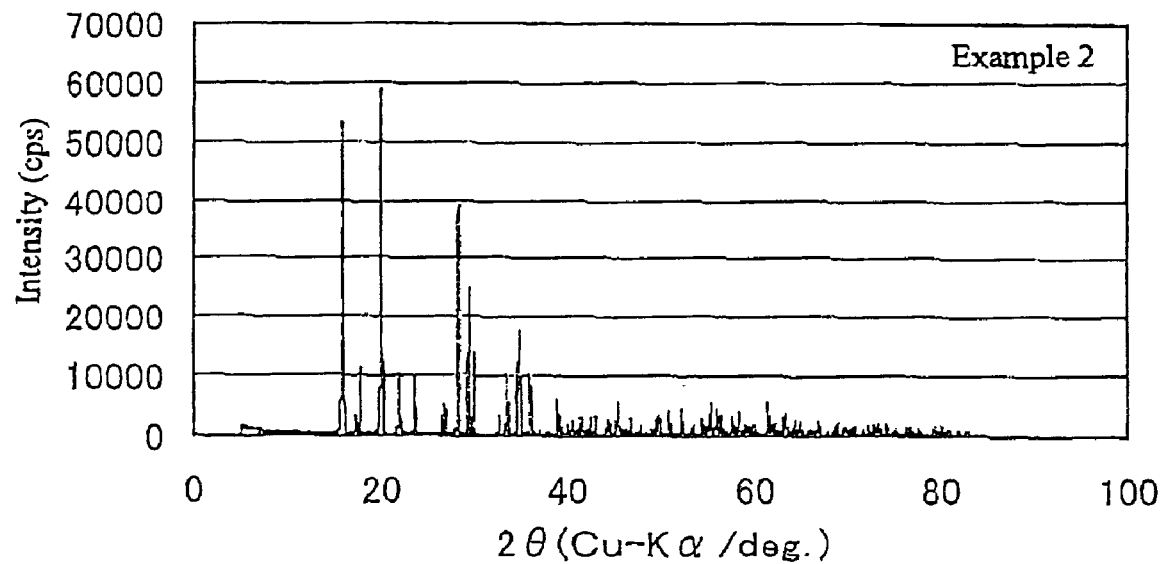
FIG. 3 is the x-ray diffraction pattern of the iron-arsenic compound obtained in Example 2.
Figure 8:
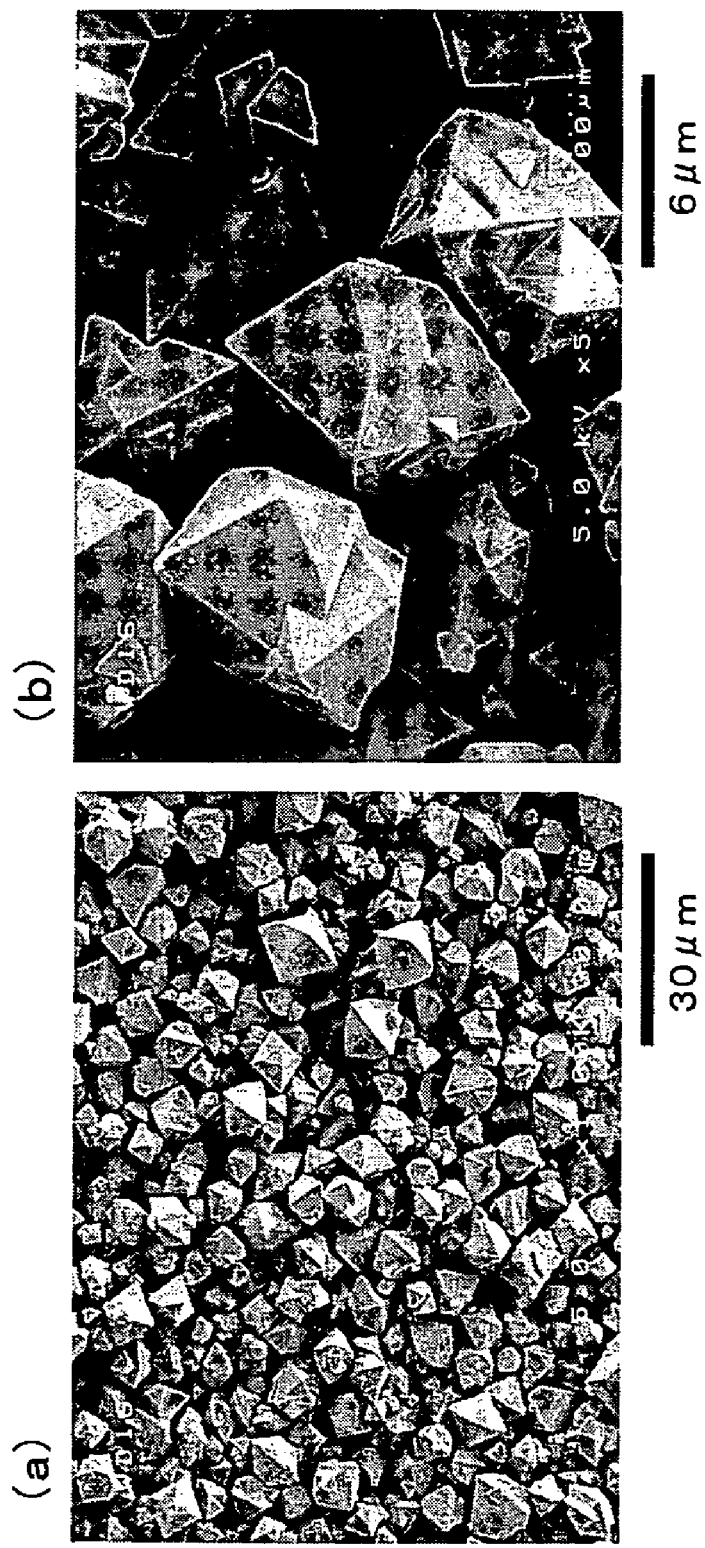
FIG. 8 is a set of SEM photographs of the iron-arsenic compound obtained in Example 1.

Under conditions of an arsenic concentration of 50 g/L, a sodium (impurity) concentration of 40 g/L and a reaction temperature of 95° C., ample precipitation of arsenic was achieved to obtain a substance whose solids component had a very low moisture content of under 10% and that had an arsenic grade exceeding 30%. Thus, arsenic was precipitated in a very compact form. The substance was composed of coarse particles, as evidenced by its average particle diameter of 8 μm and very low BET value of 0.37 m$^2$/g. The substance was identified as crystalline scorodite from its x-ray diffraction pattern (FIG. 2). Coarse crystalline particles were observed by SEM morphology observation (FIG. 8). On elution testing, the substance showed an arsenic elution rate of 0.01 mg/L, i.e., almost no elution occurred.

Example 2

The procedure of Example 1 was repeated except that the arsenic concentration of the pre-reaction solution was reduced to 30 g/L and the iron concentration thereof was reduced to 33.55 g/L. The amount of added Na$_2$SO$_4$ reagent was the same as in Example 1, to give a sodium concentration of 40 g/L. pH and ORP were measured at the point where the temperature reached 95° C. The reaction conditions were the same as in Example 1 except that the pre-reaction pH was slightly higher at 1.56.

The results are shown in Tables 1-4.

Figure 6:
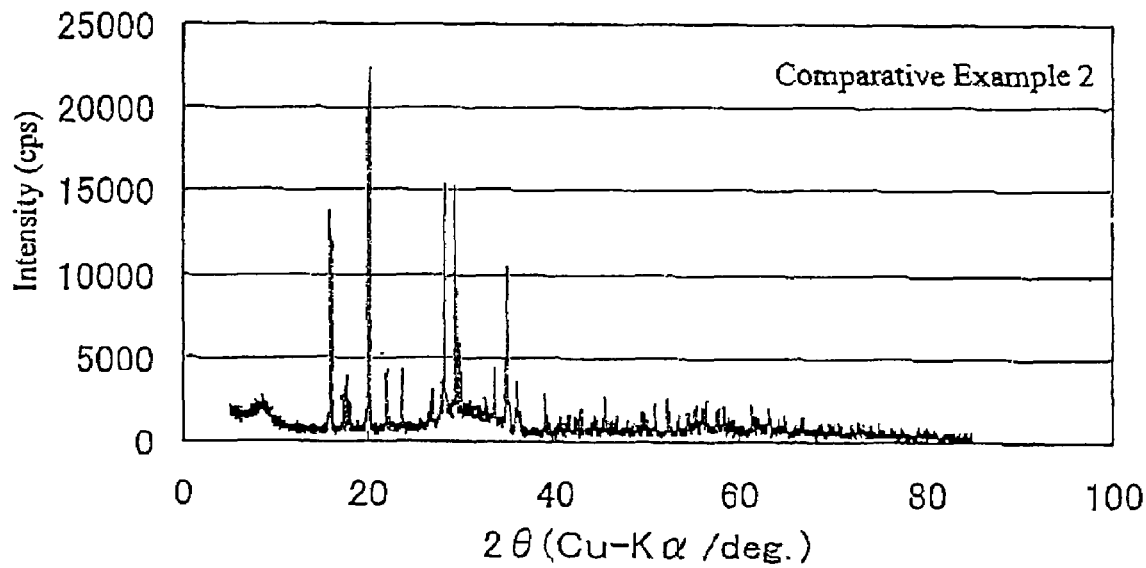
FIG. 6 is the x-ray diffraction pattern of the iron-arsenic compound obtained in Comparative Example 2.
Figure 9:
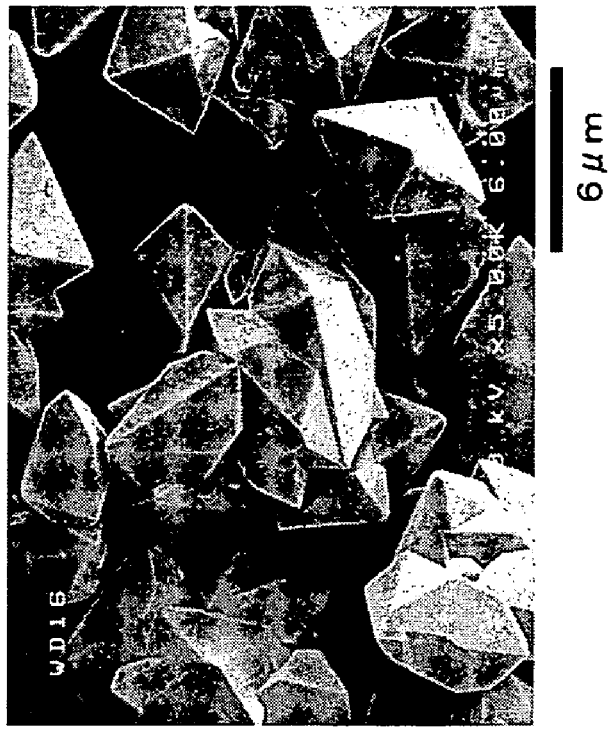
FIG. 9 is a set of SEM photographs of the iron-arsenic compound obtained in Example 2.
Figure 9:
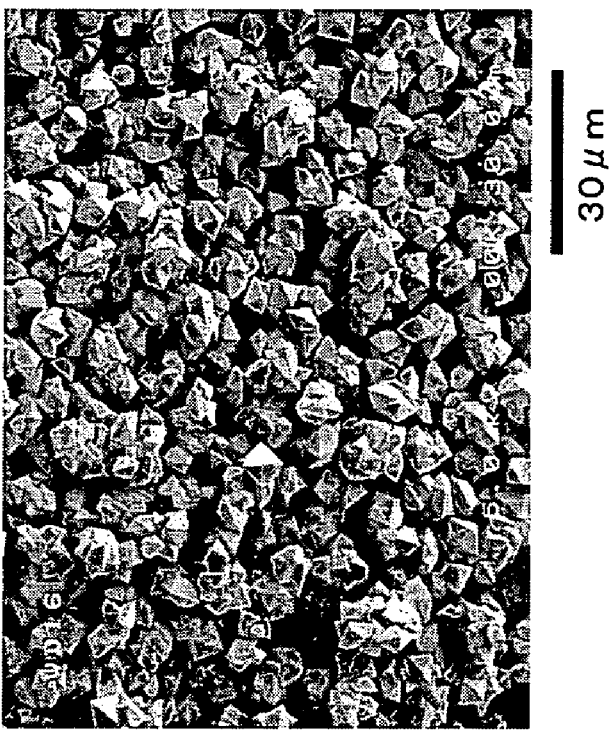

Under conditions of an arsenic concentration of 30 g/L, a sodium (impurity) concentration of 40 g/L and a reaction temperature of 95° C., ample precipitation of arsenic was achieved to obtain a substance whose solids component had a very low moisture content of under 10% and that had an arsenic grade exceeding 30%. Thus, arsenic was precipitated in a very compact form. The substance was composed of coarse particles, as evidenced by its average particle diameter of 10 μm and very low BET value of 0.37 m²/g. The substance was identified as crystalline scorodite from its x-ray diffraction pattern (FIG. 6). Coarse crystalline particles were observed by SEM morphology observation (FIG. 9). On elution testing, the substance showed an arsenic elution rate of less that 0.01 mg/L, i.e., almost no elution occurred.

Example 3

The procedure of Example 1 was repeated except that the arsenic concentration of the pre-reaction solution was reduced to 20 g/L and the iron concentration thereof was reduced to 22.36 g/L. The amount of added $Na_2SO_4$ reagent was the same as in Example 1, to give a sodium concentration of 40 g/L. pH and ORP were measured at the point where the temperature reached 95° C. The reaction conditions were the same as in Example 1 except that the pre-reaction pH was slightly higher at 1.72.

The results are shown in Tables 1-4.

Figure 4:
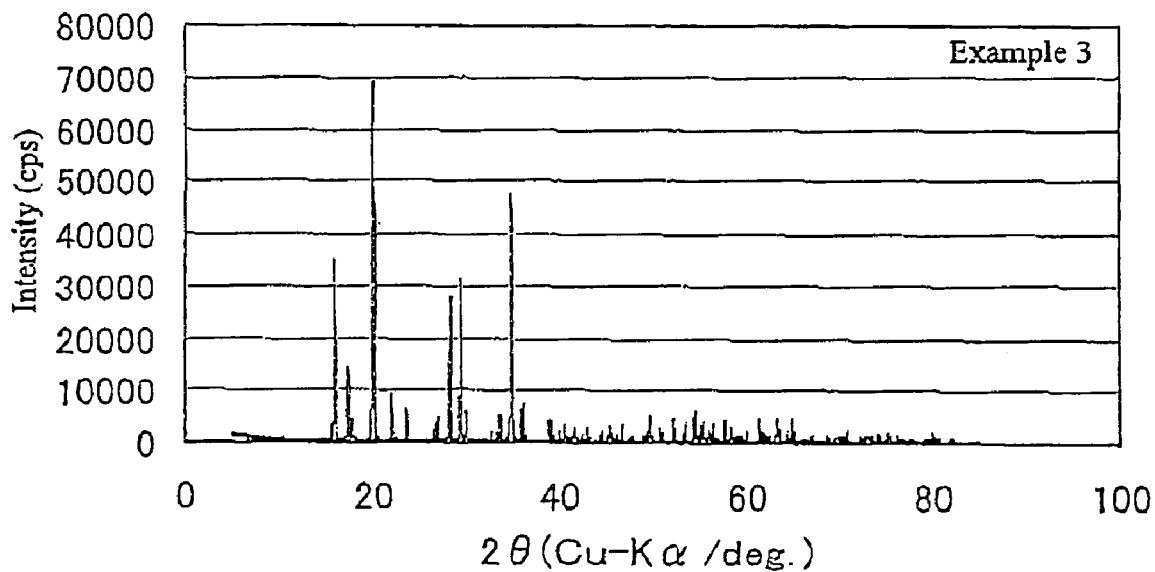
FIG. 4 is the x-ray diffraction pattern of the iron-arsenic compound obtained in Example 3.
Figure 10:
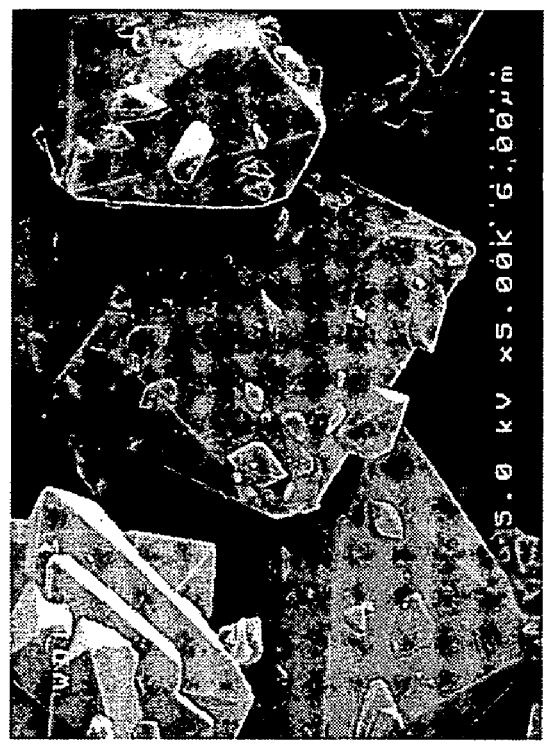
FIG. 10 is a set of SEM photographs of the iron-arsenic compound obtained in Example 3.
Figure 10:

Under conditions of an arsenic concentration of 20 g/L, a sodium (impurity) concentration of 40 g/L and a reaction temperature of 95° C., ample precipitation of arsenic was achieved to obtain a substance whose solids component had a very low moisture content of under 10% and that had an arsenic grade exceeding 30%. Thus, arsenic was precipitated in a very compact form. The substance was composed of coarse particles, as evidenced by its average particle diameter of 10 μm and very low BET value of 0.33 m²/g. The substance was identified as crystalline scorodite from its x-ray diffraction pattern (FIG. 4). Coarse crystalline particles were observed by SEM morphology observation (FIG. 10). On elution testing, the substance showed an arsenic elution rate of 0.01 mg/L, i.e., almost no elution occurred.

Comparative Example 1

The procedure of Example 1 was repeated except that the arsenic concentration of the pre-reaction solution was reduced to 10 g/L and the iron concentration thereof was reduced to 11.18 g/L. The amount of added $Na_2SO_4$ reagent was the same as in Example 1, to give a sodium concentration of 40 g/L. pH and ORP were measured at the point where the temperature reached 95° C. The reaction conditions were the same as in Example 1 except that the pre-reaction pH was slightly higher at 2.08.

The results are shown in Tables 1-4.

Figure 5:
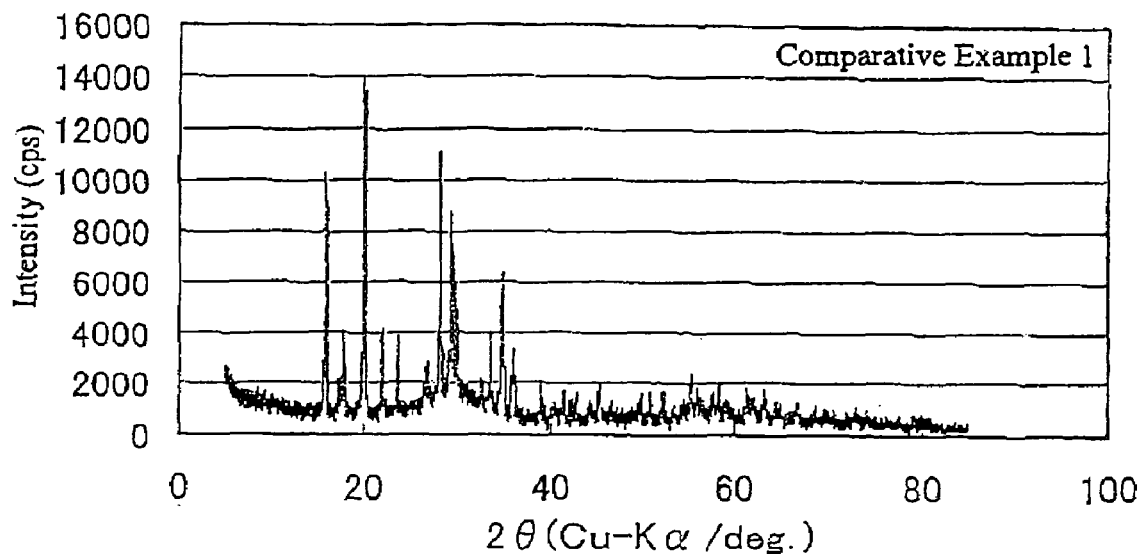
FIG. 5 is the x-ray diffraction pattern of the iron-arsenic compound obtained in Comparative Example 1.
Figure 11:
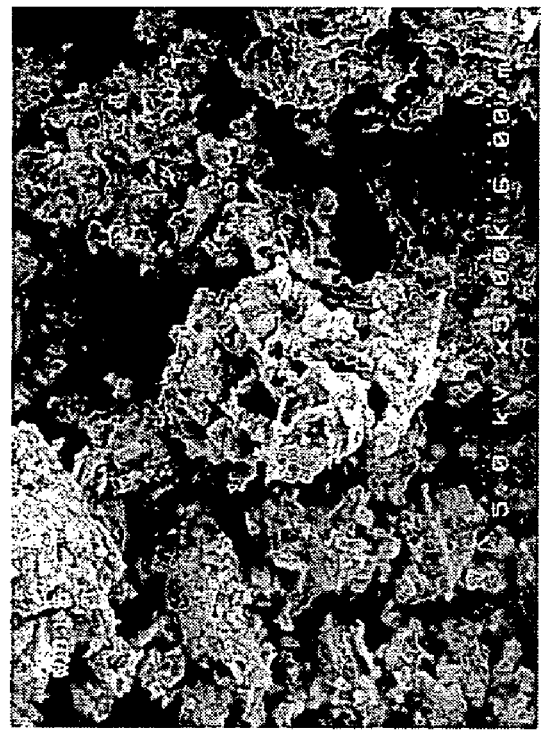
FIG. 11 is a set of SEM photographs of the iron-arsenic compound obtained in Comparative Example 1.
Figure 11:
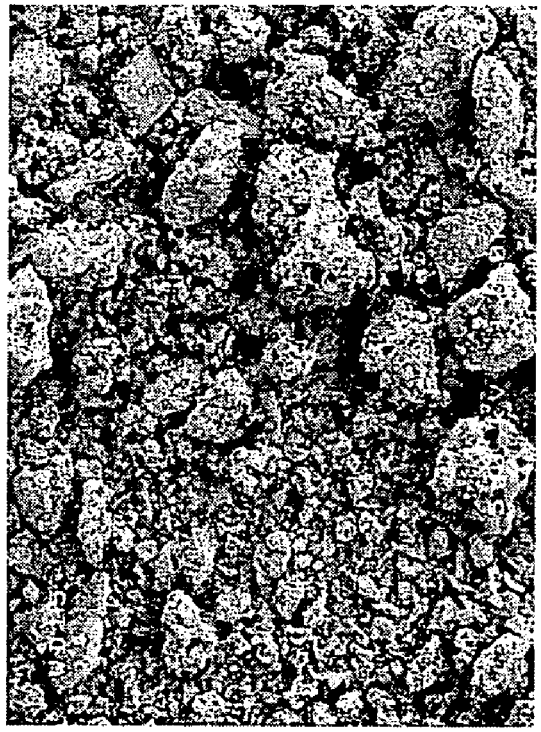

Under conditions of an arsenic concentration of 10 g/L, a sodium (impurity) concentration of 40 g/L and a reaction temperature of 95° C., ample precipitation of arsenic was achieved. However, the moisture content of the solids component was a very high 72.5%, so that arsenic was not precipitated in a compact form. The post-reaction pH was high, exceeding 1.16. From the fact that the average particle diameter was 17 μm but the BET value was an extremely high 53.47 m²/g, the substance seemed likely to consist of agglomerated particles. And a particle structure consisting of agglomerated fine crystalline particles was in fact revealed by SEM observation (FIG. 11). Although the x-ray diffraction pattern of the substance had a peak corresponding to crystalline scorodite, the baseline was very noisy and a halo pattern typical of a noncrystalline substance was observed (FIG. 5). On elution testing, the substance showed an arsenic elution rate of 24.87 mg/L, i.e., unmistakable arsenic elution was observed. This Comparative Example demonstrates that when the amount of impurity is great, formation of an iron-arsenic compound excellent in crystallinity is difficult if the arsenic concentration of the pre-reaction solution is too low.

Comparative Example 2

The procedure of Example 3 was repeated except that the sodium concentration was adjusted to a total of 40 g/L by first adding 2.875 g/L of sodium in the form of NaOH and then making up the remaining 37.125 g/L by adding $Na_2SO_4$. pH and ORP were measured at the point where the temperature reached 95° C. The reaction conditions were the same as in Example 3 except that the pre-reaction pH was slightly higher at 2.08.

The results are shown in Tables 1-4.

Figure 12:
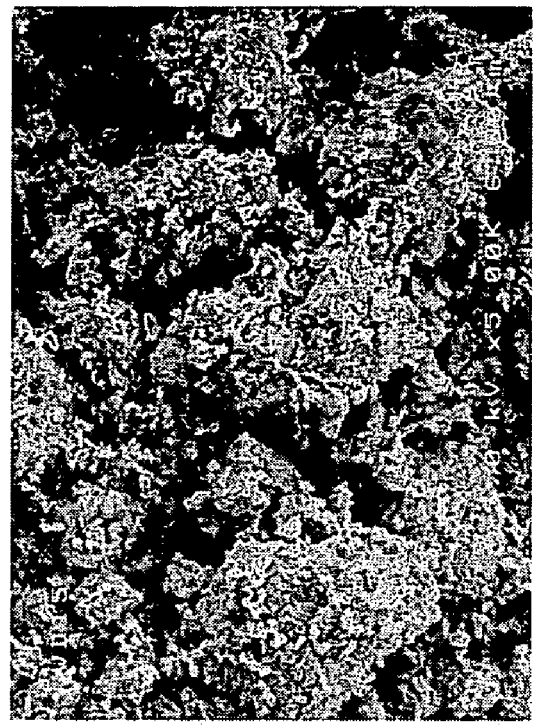
FIG. 12 is a set of SEM photographs of the iron-arsenic compound obtained in Comparative Example 2.
Figure 12:
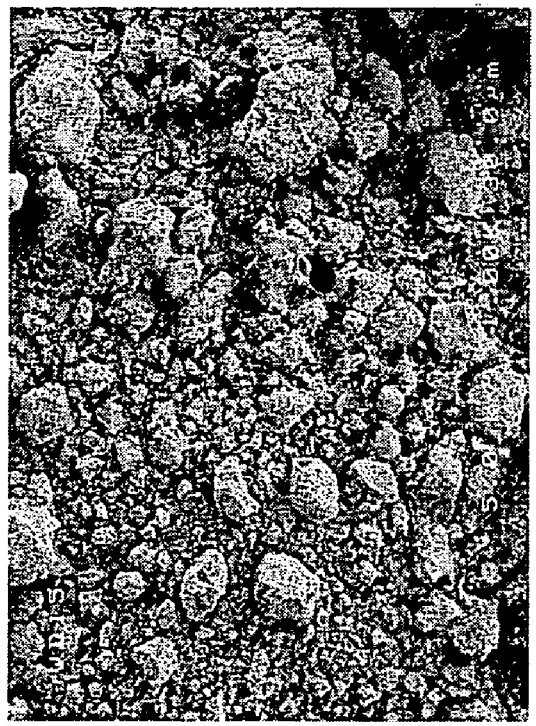

Under conditions of an arsenic concentration of 20 g/L, a sodium (impurity) concentration of 40 g/L and a reaction temperature of 95° C., ample precipitation of arsenic was achieved. However, the moisture content of the solids component was a very high 67.18%, so that arsenic was not precipitated in a compact form. The post-reaction pH was high, exceeding 1.2. From the fact that the average particle diameter was 30 μm but the BET value was an extremely high 36.60 m²/g, the substance seemed likely to consist of agglomerated particles. And a particle structure consisting of agglomerated fine crystalline particles was in fact revealed by SEM observation (FIG. 12). Although the x-ray diffraction pattern of the substance had a peak corresponding to crystalline scorodite, the baseline was very noisy and a halo pattern typical of a noncrystalline substance was observed (FIG. 6). On elution testing, the substance showed an arsenic elution rate of 18.21 mg/L, i.e., unmistakable arsenic elution was observed. This Comparative Example demonstrates that when the pre-reaction solution contains a large amount of an impurity that acts to increase pH (NaOH in this Comparative Example), formation of an iron-arsenic compound excellent in crystallinity is difficult because the post-reaction pH does not readily fall to or below 1.2 when the reaction starts at a pre-reaction pH higher than 2.0.

Comparative Example 3

The procedure of Example 3 was repeated except that the sodium concentration was adjusted to a total of 40 g/L by first adding 8.625 g/L of sodium in the form of NaOH and then making up the remaining 31.375 g/L by adding $Na_2SO_4$. pH and ORP were measured at the point where the temperature reached 95° C. The reaction conditions were the same as in Example 3 except that the pre-reaction pH was slightly higher at 2.62.

The results are shown in Tables 1-4.

Figure 7:
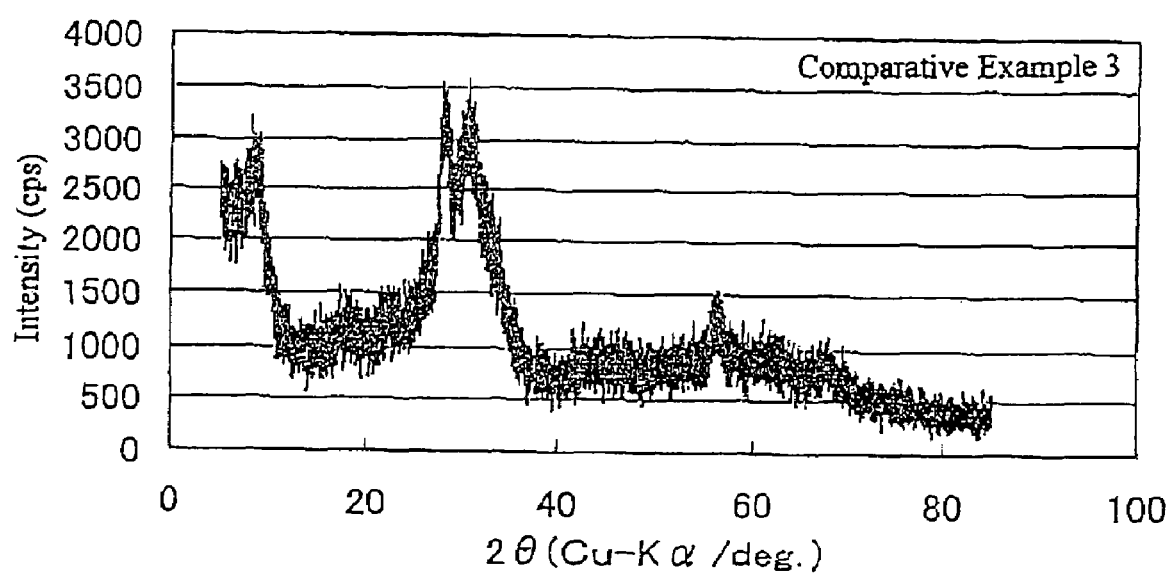
FIG. 7 is the x-ray diffraction pattern of the iron-arsenic compound obtained in Comparative Example 3.
Figure 13:
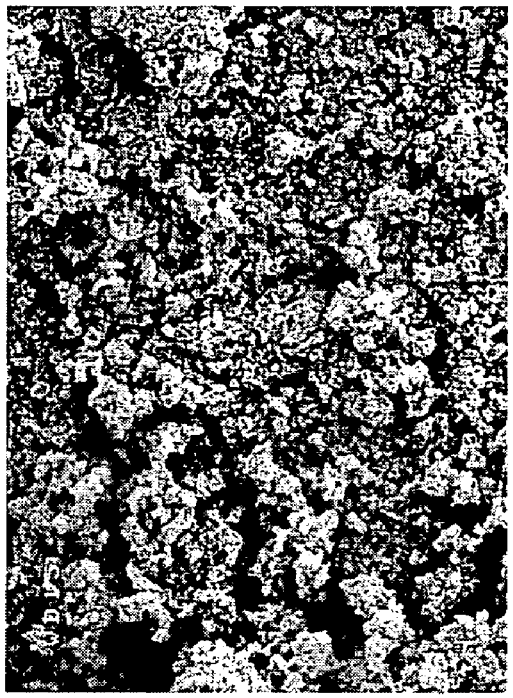
FIG. 13 is a set of SEM photographs of the iron-arsenic compound obtained in Comparative Example 3.
Figure 13:

Under conditions of an arsenic concentration of 20 g/L, a sodium (impurity) concentration of 40 g/L and a reaction temperature of 95° C., ample precipitation of arsenic was achieved. However, the moisture content of the solids component was a very high 72.31%, so that arsenic was not precipitated in a compact form. The post-reaction pH was high, exceeding 1.2. From the fact that the average particle diameter was 158 μm but the BET value was an extremely high 112.82 m²/g, the substance seemed likely to consist of agglomerated particles. And a particle structure consisting of agglomerated fine crystalline particles was in fact revealed by SEM observation (FIG. 13). The baseline of the x-ray diffraction pattern was very noisy and a halo pattern typical of a noncrystalline substance was observed (FIG. 7). On elution testing, the substance showed an arsenic elution rate of 12.37 mg/L, i.e., unmistakable arsenic elution was observed. A comparison of the results of this Comparative Example 3 with those of Comparative Example 2 demonstrates that in proportion as the pre-reaction solution contains a larger amount of an impurity acting to increase pH (NaOH), formation of an iron-arsenic compound excellent in crystallinity becomes increasingly difficult because the post-reaction pH becomes higher and higher as the pre-reaction pH rises above 2.0.

Comparative Example 4

The procedure of Example 3 was repeated except that upon measuring pH and ORP at the point where the temperature of the pre-reaction solution reached 95° C., NaOH was added to adjust the pre-reaction pH to 4. The sodium (impurity) concentration became 11.52 g/L as a result. The other reaction conditions were the same as those in Example 3.

The results are shown in Tables 5-8. The pre-reaction pH exceeded 2.0 and the post-reaction pH did not fall to or below 1.2. In this case, ample precipitation of arsenic was achieved. However, the moisture content of the solids component was a very high 77.63%, so that arsenic was not precipitated in a compact form. From the fact that the average particle diameter was 10.2 μm but the BET value was an extremely high 104.02 m$^2$/g, the substance seemed likely to consist of agglomerated fine particles. And a particle structure consisting of agglomerated fine crystalline particles was in fact revealed by SEM observation. The baseline of the x-ray diffraction pattern was very noisy and a halo pattern typical of a noncrystalline substance was observed. On elution testing, the substance showed an arsenic elution rate of 5.77 mg/L, i.e., unmistakable arsenic elution was observed.

Example 4

The procedure of Comparative Example 4 was repeated except that upon measuring pH and ORP at the point where the temperature of the pre-reaction solution reached 95° C., NaOH was added to adjust the pre-reaction pH to 2. The sodium (impurity) concentration became 2.51 g/L as a result. The other reaction conditions were the same as those in Comparative Example 4.

The results are shown in Tables 5-8.

The pre-reaction pH was 2.0 and the post-reaction pH fell below 1.2. In this case, ample precipitation of arsenic was achieved. The solids component had a very low moisture content of 12.26%, so that arsenic was precipitated in a compact form. The substance was composed of coarse particles, as evidenced by its average particle diameter of 9.73 μm and very low BET value of 0.86 m$^2$/g. The substance was identified as crystalline scorodite from its x-ray diffraction pattern. Coarse crystalline particles were observed by SEM morphology observation. On elution testing, the substance showed an arsenic elution rate of less than 0.01 mg/L, i.e., almost no elution occurred.

Example 5

The procedure of Comparative Example 4 was repeated except that upon measuring pH and ORP at the point where the temperature of the pre-reaction solution reached 95° C., no acid or alkali was added for pH adjustment, whereby the pre-reaction pH became 1.5. The other reaction conditions were the same as those in Comparative Example 4.

The results are shown in Tables 5-8.

The pre-reaction pH was 1.52 and the post-reaction pH fell below 1.2. In this case, ample precipitation of arsenic was achieved. The solids component had a very low moisture content of 11.74%, so that arsenic was precipitated in a compact form. The substance was composed of coarse particles, as evidenced by its average particle diameter of 18.6 μm and very low BET value of 0.20 m$^2$/g. The substance was identified as crystalline scorodite from its x-ray diffraction pattern. Coarse crystalline particles were observed by SEM morphology observation. On elution testing, the substance showed an arsenic elution rate of less than 0.09 mg/L, i.e., almost no elution occurred.

Example 6

The procedure of Comparative Example 4 was repeated except that upon measuring pH and ORP at the point where the temperature of the pre-reaction solution reached 95° C., sulfuric acid was added to adjust the pre-reaction pH to 1.0. The other reaction conditions were the same as those in Comparative Example 4.

The results are shown in Tables 5-8.

The pre-reaction pH was 1.02 and the post-reaction pH fell below 1.2. In this case, ample precipitation of arsenic was achieved. The solids component had a very low moisture content of 8.05%, so that arsenic was precipitated in a compact form. The substance was composed of coarse particles, as evidenced by its average particle diameter of 16.6 μm and very low BET value of 0.19 m$^2$/g. The substance was identified as crystalline scorodite from its x-ray diffraction pattern. Coarse crystalline particles were observed by SEM morphology observation. On elution testing, the substance showed an arsenic elution rate of 0.37 mg/L, i.e., some amount of arsenic elution occurred. However, the amount of elution can be seen to be quite low by calculating the weight ratio of eluted arsenic to the total arsenic content of the substance. Namely, the arsenic content at a pulp concentration of 100 g/L was 31.89%, meaning that there occurred an arsenic concentration elution of 0.37 mg/L from an arsenic concentration 31.89 g/L. The elution therefore amounted to 0.37÷1,000÷31.89× 1,000,000=12 ppm, which is a very low level of elution.

Washing of the precipitated solids was repeated. As a result, the eluted arsenic concentration decreased to lower than 0.30 mg/L.

This Example demonstrates that lowering the pre-reaction pH is advantageous from the viewpoint of precipitating coarse crystal particles low in moisture.

Example 6-2

The procedure of Comparative Example 4 was repeated except that upon measuring pH and ORP at the point where the temperature of the pre-reaction solution reached 95° C., sulfuric acid was added to adjust the pre-reaction pH to 0.5. The other reaction conditions were the same as those in Comparative Example 4.

The results are shown in Tables 5-8.

The pre-reaction pH was 0.50 and the post-reaction pH fell to 0.06. In this case, the precipitation rate was 64.9%, lower than in the other Examples. The solids component had a very low moisture content of 8.95%, so that arsenic was precipitated in a compact form. The substance was composed of coarse particles, as evidenced by its average particle diameter of 16.97 μm and very low BET value of 0.15 m$^2$/g. The substance was identified as crystalline scorodite from its x-ray diffraction pattern. Coarse crystalline particles were observed by SEM morphology observation. On elution testing, the substance showed an arsenic elution rate of 0.47 mg/L, i.e., some amount of arsenic elution occurred. However, the amount of elution can be seen to be quite low by calculating the weight ratio of eluted arsenic to the total arsenic content of the substance. Namely, the arsenic content at a pulp concentration of 100 g/L was 31.23%, meaning that there occurred an arsenic concentration elution of 0.47 mg/L from an arsenic concentration 31.23 g/L. The elution therefore amounted to 0.47÷1,000÷31.23×1,000,000=15 ppm, which is a very low level of elution.

The precipitated solids were further washed repeatedly. As a result, the eluted arsenic concentration decreased to lower than 0.30 mg/L.

This Example demonstrates that lowering the pre-reaction pH decreases the arsenic precipitation rate.

Comparative Example 6

The procedure of Comparative Example 4 was repeated except that upon measuring pH and ORP at the point where the temperature of the pre-reaction solution reached 95° C., sulfuric acid was added to adjust the pre-reaction pH to 0. The other reaction conditions were the same as those in Comparative Example 4.

The results are shown in Tables 5-8.

The pre-reaction pH was 0.00 and the post-reaction pH fell to − (minus) 0.07. In this case, the arsenic precipitation rate was 31.2%, which is too low for industrial purposes. The solids component had a very low moisture content of 5.34%, so that arsenic was precipitated in a compact form. The substance was composed of coarse particles, as evidenced by its average particle diameter of 13.71 μm and very low BET value of 0.18 m$^2$/g. The substance was identified as crystalline scorodite from its x-ray diffraction pattern. Coarse crystalline particles were observed by SEM morphology observation. Elution testing could not be performed because the amount of solids recovered was too small.

This Comparative Example demonstrates that excessive lowering of the pre-reaction pH markedly reduces the amount of iron-arsenic compound produced (the arsenic precipitation rate).

Comparative Example 7

The procedure of Comparative Example 4 was repeated except that Na$_2$SO$_4$ was added to make the sodium concentration 40 g/L. Upon measuring pH and ORP at the point where the temperature of the pre-reaction solution reached 95° C., NaOH was added to adjust the pre-reaction pH to 4. The sodium (impurity) concentration became 52.25 g/L as a result. The other reaction conditions were the same as those in Comparative Example 4.

The results are shown in Tables 5-8.

The pre-reaction pH exceeded 2.0 and the post-reaction pH did not fall to or below 1.2. In this case, ample precipitation of arsenic was achieved. However, the moisture content of the solids component was a very high 79.67%, so that arsenic was not precipitated in a compact form. From the fact that the average particle diameter was 58.79 μm but the BET value was an extremely high 80.94 m$^2$/g, the substance seemed likely to consist of agglomerated fine particles. And a particle structure consisting of agglomerated fine crystalline particles was in fact revealed by SEM observation. The baseline of the x-ray diffraction pattern was very noisy and a halo pattern typical of a noncrystalline substance was observed. On elution testing, the substance showed an arsenic elution rate of 2.34 mg/L, i.e., unmistakable arsenic elution was observed.

Example 7

The procedure of Comparative Example 7 was repeated except that upon measuring pH and ORP at the point where the temperature of the pre-reaction solution reached 95° C., sulfuric acid was added to adjust the pre-reaction pH to 1.5. The other reaction conditions were the same as those in Comparative Example 7.

The results are shown in Tables 5-8.

The pre-reaction pH was 1.50 and the post-reaction pH fell below 1.2. In this case, ample precipitation of arsenic was achieved. The solids component had a very low moisture content of 6.65%, so that arsenic was precipitated in a compact form. The substance was composed of coarse particles, as evidenced by its average particle diameter of 13.88 μm and very low BET value of 0.22 m$^2$/g. The substance was identified as crystalline scorodite from its x-ray diffraction pattern. Coarse crystalline particles were observed by SEM morphology observation. On elution testing, the substance showed an arsenic elution rate of 0.04 mg/L, i.e., almost no elution occurred.

Example 8

The procedure of Comparative Example 7 was repeated except that upon measuring pH and ORP at the point where the temperature of the pre-reaction solution reached 95° C., sulfuric acid was added to adjust the pre-reaction pH to 1.0. The other reaction conditions were the same as those in Comparative Example 7.

The results are shown in Tables 5-8.

The pre-reaction pH was 1.00 and the post-reaction pH fell below 1.2. In this case, ample precipitation of arsenic was achieved. The solids component had a very low moisture content of 7.71%, so that arsenic was precipitated in a compact form. The substance was composed of coarse particles, as evidenced by its average particle diameter of 17.04 μm and very low BET value of 0.21 m$^2$/g. The substance was identified as crystalline scorodite from its x-ray diffraction pattern. Coarse crystalline particles were observed by SEM morphology observation. On elution testing, the substance showed an arsenic elution rate of 0.11 mg/L, which is a very low level of elution.

Example 9

The procedure of Comparative Example 7 was repeated except that upon measuring pH and ORP at the point where the temperature of the pre-reaction solution reached 95° C., sulfuric acid was added to adjust the pre-reaction pH to 0.5. The other reaction conditions were the same as those in Comparative Example 7.

The results are shown in Tables 5-8.

The pre-reaction pH was 0.50 and the post-reaction pH fell below 1.2. In this case, ample precipitation of arsenic was achieved. The solids component had a very low moisture content of 12.83%, so that arsenic was precipitated in a compact form. The substance had an average particle diameter of 17.04 μm and very low BET value of 0.97 m$^2$/g. The substance was identified as crystalline scorodite from its x-ray diffraction pattern. Coarse crystalline particles intermixed with somewhat fine particles were observed by SEM morphology observation. On elution testing, the substance showed an arsenic elution rate of 0.48 mg/L, i.e., some amount of arsenic elution occurred. However, the amount of elution can be seen to be quite low by calculating the weight ratio of eluted arsenic to the total arsenic content of the substance. Namely, the arsenic content at a pulp concentration of 100 g/L was 30.13%, meaning that there occurred an arsenic concentration elution of 0.48 mg/L from an arsenic concentration 30.13 g/L. The elution therefore amounted to 0.48÷1,000÷30.13×1,000,000=16 ppm, which is a very low level of elution.

Washing of the precipitated solids was repeated. As a result, the eluted arsenic concentration decreased to lower than 0.30 mg/L.

Comparative Example 9

The procedure of Comparative Example 7 was repeated except that upon measuring pH and ORP at the point where the temperature of the pre-reaction solution reached 95° C., sulfuric acid was added to adjust the pre-reaction pH to 0. The other reaction conditions were the same as those in Comparative Example 7.

The results are shown in Tables 5-8.

The pre-reaction pH was 0.00 and the post-reaction pH fell to − (minus) 0.22. In this case, the arsenic precipitation rate was extremely low at 1.5%. This Comparative Example demonstrates that lowering of the pre-reaction pH excessively to the extent that causes the post-reaction pH to fall far below 1.2 sharply reduces the amount of iron-arsenic compound produced (the arsenic precipitation rate).

Comparative Example 10

The procedure of Comparative Example 7 was repeated except that the arsenic concentration of the pre-reaction solution was made 30 g/L and the iron concentration thereof was made 33.55 g/L. Upon measuring pH and ORP at the point where the temperature of the pre-reaction solution reached 95° C., NaOH was added to adjust the pre-reaction pH to 4. As a result, the sodium (impurity) concentration, including the amount added as $Na_2SO_4$, came to 48.3 g/L. The other reaction conditions were the same as those in Comparative Example 7.

The results are shown in Tables 5-8.

The pre-reaction pH exceeded 2.0 and the post-reaction pH did not fall to or below 1.2. In this case, ample precipitation of arsenic was achieved. However, the moisture content of the solids component was a very high 67.03%, so that arsenic was not precipitated in a compact form. From the fact that the average particle diameter was 70.1 µm but the BET value was a high 5.51 m$^2$/g, the substance seemed likely to consist of agglomerated fine particles. And a particle structure consisting of agglomerated fine crystalline particles was in fact revealed by SEM observation. The baseline of the x-ray diffraction pattern was very noisy and a halo pattern typical of a noncrystalline substance was observed. On elution testing, the substance showed an arsenic elution rate of 0.63 mg/L, i.e., arsenic elution was observed.

Comparative Example 11

The procedure of Comparative Example 10 was repeated. Upon measuring pH and ORP at the point where the temperature of the pre-reaction solution reached 95° C., NaOH was added to adjust the pre-reaction pH to 2. As a result, the sodium (impurity) concentration came to 43.21 g/L. The other reaction conditions were the same as those in Comparative Example 10.

The results are shown in Tables 5-8.

The pre-reaction pH was 2.00 but gelling of the precipitate at the start of the reaction made stirring impossible. The operation was therefore discontinued. A small amount of sampled gel was filtered off, dried, and subjected to x-ray diffraction pattern measurement. A halo pattern typical of a noncrystalline substance was observed. On elution testing, the substance showed an arsenic elution rate of 1,502 mg, i.e., unmistakable arsenic elution was observed.

Example 10

The procedure of Comparative Example 10 was repeated except that upon measuring pH and ORP at the point where the temperature of the pre-reaction solution reached 95° C., sulfuric acid was added to adjust the pre-reaction pH to 1.5. The other reaction conditions were the same as those in Comparative Example 10.

The results are shown in Tables 5-8.

The pre-reaction pH was 1.51 and the post-reaction pH fell below 1.2. In this case, ample precipitation of arsenic was achieved. The solids component had a very low moisture content of 8.23%, so that arsenic was precipitated in a compact form. The substance was composed of coarse particles, as evidenced by its average particle diameter of 13.68 µm and very low BET value of 0.38 m$^2$/g. The substance was identified as crystalline scorodite from its x-ray diffraction pattern. Coarse crystalline particles were observed by SEM morphology observation. On elution testing, the substance showed an arsenic elution rate of 0.02 mg/L, i.e., almost no elution occurred.

Example 11

The procedure of Comparative Example 10 was repeated except that upon measuring pH and ORP at the point where the temperature of the pre-reaction solution reached 95° C., sulfuric acid was added to adjust the pre-reaction pH to 1.0. The other reaction conditions were the same as those in Comparative Example 10.

The results are shown in Tables 5-8.

The pre-reaction pH was 1.00 and the post-reaction pH fell below 1.2. In this case, ample precipitation of arsenic was achieved. The solids component had a very low moisture content of 7.26%, so that arsenic was precipitated in a compact form. The substance was composed of coarse particles, as evidenced by its average particle diameter of 19.21 µm and very low BET value of 0.20 m$^2$/g. The substance was identified as crystalline scorodite from its x-ray diffraction pattern. Coarse crystalline particles were observed by SEM morphology observation. On elution testing, the substance showed an arsenic elution rate of 0.07 mg/L, i.e., almost no elution occurred.

Example 12

The procedure of Comparative Example 10 was repeated except that upon measuring pH and ORP at the point where the temperature of the pre-reaction solution reached 95° C., sulfuric acid was added to adjust the pre-reaction pH to 0.5. The other reaction conditions were the same as those in Comparative Example 10.

The results are shown in Tables 5-8.

The pre-reaction pH was 0.50 and the post-reaction pH fell below 1.2. In this case, ample precipitation of arsenic was achieved. The solids component had a very low moisture content of 9.95%, so that arsenic was precipitated in a compact form. The substance was composed of coarse particles, as evidenced by its average particle diameter of 19.48 µm and very low BET value of 0.18 m$^2$/g. The substance was identified as crystalline scorodite from its x-ray diffraction pattern. Coarse crystalline particles were observed by SEM morphology observation. On elution testing, the substance showed an arsenic elution rate of 0.26 mg/L, which is a very low level of elution.

Example 13

The procedure of Comparative Example 10 was repeated except that upon measuring pH and ORP at the point where the temperature of the pre-reaction solution reached 95° C., sulfuric acid was added to adjust the pre-reaction pH to 0. The other reaction conditions were the same as those in Comparative Example 10.

The results are shown in Tables 5-8.

The pre-reaction pH was 0.00 and the post-reaction pH fell below 1.2. In this case, ample precipitation of arsenic was achieved. The solids component had a very low moisture content of 7.38%, so that arsenic was precipitated in a compact form. The substance was composed of coarse particles, as evidenced by its average particle diameter of 10.57 μm and very low BET value of 0.36 m$^2$/g. The substance was identified as crystalline scorodite from its x-ray diffraction pattern. Coarse crystalline particles were observed by SEM morphology observation. On elution testing, the substance showed an arsenic elution rate of 0.79 mg/L, i.e., some amount of arsenic elution occurred. However, the amount of elution can be seen to be quite low by calculating the weight ratio of eluted arsenic to the total arsenic content of the substance. Namely, the arsenic content at a pulp concentration of 100 g/L was 29.7%, meaning that there occurred an arsenic concentration elution of 0.79 mg/L from an arsenic concentration 29.7 g/L. The elution therefore amounted to 0.79÷1,000÷29.7× 1,000,000=27 ppm, which is a very low level of elution.

Washing of the precipitated solids was repeated. As a result, the eluted arsenic concentration decreased to lower than 0.30 mg/L.

A comparison of the results of this Example 13 with those of Comparative Example 9 demonstrates that increasing the arsenic concentration of the pre-reaction solution from 20 g/L to 30 g/L improves the precipitation rate of arsenic when the pH of the pre-reaction solution is low.

Comparative Example 12

The procedure of Comparative Example 10 was repeated except that the arsenic concentration of the pre-reaction solution was made 40 g/L and the iron concentration thereof was made 44.8 g/L. Upon measuring pH and ORP at the point where the temperature of the pre-reaction solution reached 95° C., NaOH was added to adjust the pre-reaction pH to 4. As a result, the sodium (impurity) concentration, including the amount added as Na$_2$SO$_4$, came to 61.55 g/L. The other reaction conditions were the same as those in Comparative Example 10.

The results are shown in Tables 5-8.

The pre-reaction pH exceeded 2.0 and gelling of the precipitate at the start of the reaction made stirring impossible. The operation was therefore discontinued.

A comparison of the results of this Comparative Example 12 with those of Comparative Example 10 demonstrates that making the arsenic concentration of the pre-reaction solution high when its pH is high results in ready occurrence of gelling.

Comparative Example 13

The procedure of Comparative Example 12 was repeated except that upon measuring pH and ORP at the point where the temperature of the pre-reaction solution reached 95° C., NaOH was added to adjust the pre-reaction pH to 2. The sodium (impurity) concentration became 45.48 g/L as a result. The other reaction conditions were the same as those in Comparative Example 12.

The results are shown in Tables 5-8.

The pre-reaction pH was 2.00 but gelling of the precipitate at the start of the reaction made stirring impossible. The operation was therefore discontinued.

Comparative Example 14

The procedure of Comparative Example 12 was repeated except that upon measuring pH and ORP at the point where the temperature of the pre-reaction solution reached 95° C., no acid or alkali was added for pH adjustment, whereby the pre-reaction pH became 1.5. The sodium (impurity) concentration was 40.00 g/L. The other reaction conditions were the same as those in Comparative Example 12.

The results are shown in Tables 5-8.

The pre-reaction pH was 1.39 but gelling of the precipitate at the start of the reaction made stirring impossible. The operation was therefore discontinued.

Example 14

The procedure of Comparative Example 12 was repeated except that upon measuring pH and ORP at the point where the temperature of the pre-reaction solution reached 95° C., sulfuric acid was added to adjust the pre-reaction pH to 1.0. The other reaction conditions were the same as those in Comparative Example 12.

The results are shown in Tables 5-8.

The pre-reaction pH was 1.00 and the post-reaction pH fell below 1.2. In this case, ample precipitation of arsenic was achieved. The solids component had a very low moisture content of 6.33%, so that arsenic was precipitated in a compact form. The substance was composed of coarse particles, as evidenced by its average particle diameter of 17.47 μm and very low BET value of 0.23 m$^2$/g. The substance was identified as crystalline scorodite from its x-ray diffraction pattern. Coarse crystalline particles were observed by SEM morphology observation. On elution testing, the substance showed an arsenic elution rate of 0.04 mg/L, i.e., almost no elution occurred.

Example 15

The procedure of Comparative Example 12 was repeated except that upon measuring pH and ORP at the point where the temperature of the pre-reaction solution reached 95° C., sulfuric acid was added to adjust the pre-reaction pH to 0.5. The other reaction conditions were the same as those in Comparative Example 12.

The results are shown in Tables 5-8.

The pre-reaction pH was 0.50 and the post-reaction pH fell below 1.2. In this case, ample precipitation of arsenic was achieved. The solids component had a very low moisture content of 6.39%, so that arsenic was precipitated in a compact form. The substance was composed of coarse particles, as evidenced by its average particle diameter of 20.30 μm and very low BET value of 0.27 m$^2$/g. The substance was identified as crystalline scorodite from its x-ray diffraction pattern. Coarse crystalline particles were observed by SEM morphology observation. On elution testing, the substance showed an arsenic elution rate of 0.07 mg/L, i.e., almost no elution occurred.

Example 16

The procedure of Comparative Example 12 was repeated except that upon measuring pH and ORP at the point where the temperature of the pre-reaction solution reached 95° C., sulfuric acid was added to adjust the pre-reaction pH to 0. The other reaction conditions were the same as those in Comparative Example 12.

The results are shown in Tables 5-8.

The pre-reaction pH was 0.00 and the post-reaction pH fell below 1.2. In this case, ample precipitation of arsenic was achieved. The solids component had a very low moisture content of 4.6%, so that arsenic was precipitated in a compact form. The substance had an average particle diameter of 6.51 μm and low BET value of 0.47 m$^2$/g. The substance was identified as crystalline scorodite from its x-ray diffraction pattern. Coarse crystalline particles intermixed with somewhat fine particles were observed by SEM morphology observation. On elution testing, the substance showed an arsenic elution rate of 0.35 mg/L, i.e., some amount of arsenic elution occurred. However, the amount of elution can be seen to be quite low by calculating the weight ratio of eluted arsenic to the total arsenic content of the substance. Namely, the arsenic content at a pulp concentration of 100 g/L was 29.46%, meaning that there occurred an arsenic concentration elution of 0.35 mg/L from an arsenic concentration 29.46 g/L. The elution therefore amounted to 0.35÷1,000÷29.46× 1,000,000=12 ppm, which is a very low level of elution.

Washing of the precipitated solids was repeated. As a result, the eluted arsenic concentration decreased to lower than 0.30 mg/L.

Comparative Example 15

The procedure of Comparative Example 12 was repeated except that CuSO$_4$.5H$_2$O was added to give a concentration of copper as impurity of 40 g/L. Upon measuring pH and ORP at the point where the temperature of the pre-reaction solution reached 95° C., NaOH was added to adjust the pre-reaction pH to 3. The sodium (impurity) concentration became 27.55 g/L as a result. The other reaction conditions were the same as those in Comparative Example 12.

The results are shown in Tables 5-8.

The pre-reaction pH exceeded 2.0 and gelling of the precipitate at the start of the reaction made stirring impossible. The operation was therefore discontinued.

Comparative Example 16

The procedure of Comparative Example 15 was repeated except that upon measuring pH and ORP at the point where the temperature of the pre-reaction solution reached 95° C., NaOH was added to adjust the pre-reaction pH to 2. The sodium (impurity) concentration became 19.87 g/L as a result. The other reaction conditions were the same as those in Comparative Example 15.

The results are shown in Tables 5-8.

The pre-reaction pH exceeded 2.0 and the post-reaction pH did not fall to or below 1.2. In this case, ample precipitation of arsenic was achieved. However, the moisture content of the solids component was a very high 59.06%, so that arsenic was not precipitated in a compact form. From the fact that the average particle diameter was 39.36 μm but the BET value was an extremely high 84.64 m$^2$/g, the substance seemed likely to consist of agglomerated fine particles. And a particle structure consisting of agglomerated fine crystalline particles was in fact revealed by SEM observation. The baseline of the x-ray diffraction pattern was very noisy and a halo pattern typical of a noncrystalline substance was observed. On elution testing, the substance showed an arsenic elution rate of 2.28 mg/L, i.e., arsenic elution was observed.

Example 17

The procedure of Comparative Example 15 was repeated except that upon measuring pH and ORP at the point where the temperature of the pre-reaction solution reached 95° C., sulfuric acid was added to adjust the pre-reaction pH to 1.0. The other reaction conditions were the same as those in Comparative Example 15.

The results are shown in Tables 5-8.

The pre-reaction pH was 1.00 and the post-reaction pH fell below 1.2. In this case, ample precipitation of arsenic was achieved. The solids component had a very low moisture content of 6.19%, so that arsenic was precipitated in a compact form. The substance had an average particle diameter of 7.91 μm and a very low BET value of 0.43 m$^2$/g. The substance was identified as crystalline scorodite from its x-ray diffraction pattern. Coarse crystalline particles intermixed with somewhat fine spindle shape particles were observed by SEM morphology observation. On elution testing, the substance showed an arsenic elution rate of 0.02 mg/L, i.e., almost no elution occurred.

Example 18

The procedure of Comparative Example 15 was repeated except that upon measuring pH and ORP at the point where the temperature of the pre-reaction solution reached 95° C., sulfuric acid was added to adjust the pre-reaction pH to 0.5. The other reaction conditions were the same as those in Comparative Example 15.

The results are shown in Tables 5-8.

The pre-reaction pH was 0.50 and the post-reaction pH fell below 1.2. In this case, ample precipitation of arsenic was achieved. The solids component had a very low moisture content of 8.45%, so that arsenic was precipitated in a compact form. The substance had an average particle diameter of 3.59 μm and a very low BET value of 0.85 m$^2$/g. The substance was identified as crystalline scorodite from its x-ray diffraction pattern. Spindle shape crystalline particles were observed by SEM morphology observation. On elution testing, the substance showed an arsenic elution rate of 0.09 mg/L, i.e., almost no elution occurred.

Comparative Example 17

The procedure of Comparative Example 15 was repeated except that upon measuring pH and ORP at the point where the temperature of the pre-reaction solution reached 95° C., sulfuric acid was added to adjust the pre-reaction pH to 0. The other reaction conditions were the same as those in Comparative Example 15.

The results are shown in Tables 5-8.

The pre-reaction pH was 0.00 and the post-reaction pH fell to – (minus) 0.48. In this case, no arsenic precipitated whatsoever. This Comparative Example demonstrates that the behavior of the precipitation reaction differs depending on the type of impurity, so that increasing the arsenic concentration does not necessarily improve the precipitation rate. The arsenic concentration and pH of the pre-reaction solution should therefore be adjusted as suitable for the type of impurity.

TABLE 1

| No. | Reaction vessel | As conc. (g/L) | Fe Conc. (g/L) | Fe Source (Reagent) | Prep. Fe/As | Other elements | Conc. (g/L) | pH before reaction | pH after reaction | Stir speed (rpm) | Reaction temp. (°C.) | Gas | Reaction time (Hr) |
|---|---|---|---|---|---|---|---|---|---|---|---|---|---|
| Exmp. 1 | 2 L glass | 50 | 55.91 | FeSO$_4$ | 1.50 | Na$_2$SO$_4$ | 40 | 1.25 | 0.42 | 1000 | 95 | O$_2$ | 7 |
| Exmp. 2 | 2 L glass | 30 | 33.55 | FeSO$_4$ | 1.50 | Na$_2$SO$_4$ | 40 | 1.56 | 0.82 | 1000 | 95 | O$_2$ | 7 |
| Exmp. 3 | 2 L glass | 20 | 22.36 | FeSO$_4$ | 1.50 | Na$_2$SO$_4$ | 40 | 1.72 | 1.16 | 1000 | 95 | O$_2$ | 7 |
| Comp. Ex. 1 | 2 L glass | 10 | 11.18 | FeSO$_4$ | 1.50 | Na$_2$SO$_4$ | 40 | 2.08 | 1.57 | 1000 | 95 | O$_2$ | 7 |
| Comp. Ex. 2 | 2 L glass | 20 | 22.36 | FeSO$_4$ | 1.50 | Na$_2$SO$_4$ NaOH | 40 | 2.08 | 1.31 | 1000 | 95 | O$_2$ | 7 |
| Comp. Ex. 3 | 2 L glass | 20 | 22.36 | FeSO$_4$ | 1.50 | Na$_2$SO$_4$ NaOH | 40 | 2.62 | 1.6 | 1000 | 95 | O$_2$ | 7 |

TABLE 2

| No. | Filterability (L per min. per m$^2$) | pH | ORP mV | FA g/L | Cu mg/L | As g/L | Fe g/L | Na g/L | S g/L | Precipitation rate (% based on solution) As | Precipitation rate Fe | Total solution (m$^3$ per ton As) | As solution (m$^3$ per ton As) |
|---|---|---|---|---|---|---|---|---|---|---|---|---|---|
| Exmp. 1 | 454 | 0.42 | 438 | 60 | | 0.71 | 19.77 | 38.79 | 60.88 | 98.6% | 64.6% | 20 | 20 |
| Exmp. 2 | 727 | 0.82 | 447 | 35 | | 0.26 | 12.38 | 38.89 | 48.78 | 99.1% | 63.1% | 34 | 34 |
| Exmp. 3 | 727 | 1.16 | 429 | 22 | | 0.18 | 7.83 | 38.77 | 41.06 | 99.1% | 65.0% | 50 | 50 |
| Comp. Ex. 1 | 7 | 1.57 | 391 | 10 | | 0.23 | 4.06 | 39.66 | 34.88 | 97.7% | 63.7% | 102 | 102 |
| Comp. Ex. 2 | 1 | 1.31 | 409 | 18 | | 0.62 | 8.46 | 38.61 | 39.06 | 96.9% | 62.2% | 52 | 52 |
| Comp. Ex. 3 | 1 | 1.60 | 396 | 11 | | 0.31 | 6.70 | 39.71 | 34.55 | 98.5% | 70.1% | 51 | 51 |

TABLE 3

| No. | Solids wet (g/L) | Moist. (WB %) | Cu ppm | As % | Fe % | Na ppm | S ppm | Fe/As (Molar ratio) | Yield (WT per ton AS) | Elution conc. (mg/L) | Ave (μm) | 5 μm rate (%) | BET (m$^2$/g) | Specific grav. (g/cc) | Compressed conc. (g/cc) | XRD |
|---|---|---|---|---|---|---|---|---|---|---|---|---|---|---|---|---|
| Exmp. 1 | 156.1 | 5.75 | | 31.10 | 24.37 | 698 | 6600 | 1.05 | 3.41 | 0.01 | 8.14 | 8.3% | 0.37 | 3.29 | 2.04 | Crystal |
| Exmp. 2 | 96.5 | 6.80 | | 32.19 | 24.51 | 533 | 2700 | 1.02 | 3.33 | <0.01 | 10.61 | 2.7% | 0.37 | 3.31 | 1.98 | Crystal |
| Exmp. 3 | 60.9 | 6.03 | | 31.20 | 24.40 | 715 | 4800 | 1.05 | 3.41 | 0.01 | 10.48 | 2.5% | 0.33 | 3.26 | 2.07 | Crystal |
| Comp. Ex. 1 | 107.3 | 72.50 | | 29.43 | 23.75 | 14979 | 16500 | 1.08 | 12.36 | 24.87 | 17.17 | 18.1% | 53.47 | 3.82 | 1.78 | A + Crystal |
| Comp. Ex. 2 | 183.1 | 67.18 | | 29.51 | 23.07 | 17120 | 14900 | 1.05 | 10.32 | 18.21 | 30.40 | 15.0% | 36.60 | 3.51 | 1.84 | A + Crystal |
| Comp. Ex. 3 | 233.2 | 72.31 | | 27.64 | 23.75 | 24800 | 19500 | 1.15 | 13.07 | 12.37 | 158.84 | 3.8% | 112.82 | 6.26 | 1.34 | A |

A is amorphous

TABLE 4

| No. | pH time course 0 Hr | 1 Hr | 2 Hr | 3 Hr | 4 Hr | 5 Hr | 6 Hr | 7 Hr | ORP time course 0 Hr | 1 Hr | 2 Hr | 3 Hr | 4 Hr | 5 Hr | 6 Hr | 7 Hr | Eluted As (mg/L) | Eluted Fe (mg/L) | Eluted S (mg/L) |
|---|---|---|---|---|---|---|---|---|---|---|---|---|---|---|---|---|---|---|---|
| Exmp. 1 | 1.25 | 1.02 | 0.9 | 0.86 | 0.54 | 0.42 | 0.42 | 0.42 | 134 | 165 | 239 | 270 | 304 | 398 | 426 | 438 | 0.01 | 2.73 | 10 |
| Exmp. 2 | 1.56 | 0.96 | 0.84 | 0.82 | 0.82 | 0.82 | 0.82 | 0.82 | 133 | 192 | 363 | 404 | 424 | 432 | 441 | 447 | <0.01 | 2.42 | 10 |
| Exmp. 3 | 1.72 | 1.34 | 1.24 | 1.17 | 1.16 | 1.16 | 1.16 | 1.16 | 146 | 240 | 259 | 347 | 392 | 405 | 421 | 429 | 0.01 | 2.77 | 10 |
| Comp. Ex. 1 | 2.08 | 1.68 | 1.64 | 1.61 | 1.58 | 1.58 | 1.57 | 1.57 | 140 | 282 | 322 | 345 | 361 | 371 | 387 | 391 | 24.87 | 32.56 | |
| Comp. Ex. 2 | 2.08 | 1.39 | 1.35 | 1.35 | 1.31 | 1.31 | 1.31 | 1.31 | 101 | 267 | 330 | 359 | 377 | 393 | 403 | 409 | 18.21 | 113.8 | 670 |
| Comp. Ex. 3 | 2.62 | 1.72 | 1.67 | 1.65 | 1.65 | 1.61 | 1.61 | 1.6 | 30 | 301 | 327 | 344 | 362 | 375 | 385 | 396 | 12.37 | 36.65 | 680 |

TABLE 5

| No. | Reaction vessel | As conc. (g/L) | Fe Conc. (g/L) | Fe Source (Reagent) | Prep. Fe:As | Other elements | Conc. (g/L) | pH before reaction | pH after reaction | Acid conc. g/L | Stir speed (rpm) | Reaction temp. (°C.) | Gas | Reaction time (Hr) |
|---|---|---|---|---|---|---|---|---|---|---|---|---|---|---|
| Comp. Ex. 4 | 2 L glass | 20 | 22.36 | FeSO₄ | 1.50 | | | 4.00 | 1.85 | | 1000 | 95 | O₂ | 7 |
| Exmp. 4 | 2 L glass | 20 | 22.36 | FeSO₄ | 1.50 | | | 2.00 | 0.58 | | 1000 | 95 | O₂ | 7 |
| Exmp. 5 | 2 L glass | 20 | 22.36 | FeSO₄ | 1.50 | | | 1.52 | 0.35 | 0.0 | 1000 | 95 | O₂ | 7 |
| Exmp. 6 | 2 L glass | 20 | 22.36 | FeSO₄ | 1.50 | | | 1.02 | 0.24 | 11.0 | 1000 | 95 | O₂ | 7 |
| Exmp. 6-2 | 2 L glass | 20 | 22.36 | FeSO₄ | 1.50 | | | 0.50 | 0.06 | 37.6 | 1000 | 95 | O₂ | 7 |
| Comp. Ex. 6 | 2 L glass | 20 | 22.36 | FeSO₄ | 1.50 | | | 0.00 | −0.07 | 56.1 | 1000 | 95 | O₂ | 7 |
| Comp. Ex. 7 | 2 L glass | 20 | 22.36 | FeSO₄ | 1.50 | Na₂SO₄ | 40 | 4.02 | 2.12 | | 1000 | 95 | O₂ | 7 |
| Exmp. 7 | 2 L glass | 20 | 22.36 | FeSO₄ | 1.50 | Na₂SO₄ | 40 | 1.50 | 0.98 | 5.7 | 1000 | 95 | O₂ | 7 |
| Exmp. 8 | 2 L glass | 20 | 22.36 | FeSO₄ | 1.50 | Na₂SO₄ | 40 | 1.00 | 0.59 | 25.9 | 1000 | 95 | O₂ | 7 |
| Exmp. 9 | 2 L glass | 20 | 22.36 | FeSO₄ | 1.50 | Na₂SO₄ | 40 | 0.50 | 0.24 | 53.0 | 1000 | 95 | O₂ | 7 |
| Comp. Ex. 9 | 2 L glass | 20 | 22.36 | FeSO₄ | 1.50 | Na₂SO₄ | 40 | 0.00 | −0.22 | 107.0 | 1000 | 95 | O₂ | 7 |
| Comp. Ex. 10 | 2 L glass | 30 | 33.55 | FeSO₄ | 1.50 | Na₂SO₄ | 40 | 4.03 | 2.03 | | 1000 | 95 | O₂ | 7 |
| Comp. Ex. 11 | 2 L glass | 30 | 33.55 | FeSO₄ | 1.50 | Na₂SO₄ | 40 | 2.00 | | | 1000 | 95 | O₂ | 7 |
| Exmp. 10 | 2 L glass | 30 | 33.55 | FeSO₄ | 1.50 | Na₂SO₄ | 40 | 1.51 | 0.75 | 0.0 | 1000 | 95 | O₂ | 7 |
| Exmp. 11 | 2 L glass | 30 | 33.55 | FeSO₄ | 1.50 | Na₂SO₄ | 40 | 1.00 | 0.44 | 17.6 | 1000 | 95 | O₂ | 7 |
| Exmp. 12 | 2 L glass | 30 | 33.55 | FeSO₄ | 1.50 | Na₂SO₄ | 40 | 0.50 | 0.06 | 48.3 | 1000 | 95 | O₂ | 7 |
| Exmp. 13 | 2 L glass | 30 | 33.55 | FeSO₄ | 1.50 | Na₂SO₄ | 40 | 0.00 | −0.40 | 90.0 | 1000 | 95 | O₂ | 7 |
| Comp. Ex. 12 | 2 L glass | 40 | 44.80 | FeSO₄ | 1.50 | Na₂SO₄ | 40 | 4.00 | | | 1000 | 95 | O₂ | 7 |
| Comp. Ex. 13 | 2 L glass | 40 | 44.80 | FeSO₄ | 1.50 | Na₂SO₄ | 40 | 2.00 | | | 1000 | 95 | O₂ | 7 |
| Comp. Ex. 14 | 2 L glass | 40 | 44.80 | FeSO₄ | 1.50 | Na₂SO₄ | 40 | 1.39 | | 0.0 | 1000 | 95 | O₂ | 7 |
| Exmp. 14 | 2 L glass | 40 | 44.80 | FeSO₄ | 1.50 | Na₂SO₄ | 40 | 1.00 | 0.32 | 12.4 | 1000 | 95 | O₂ | 7 |
| Exmp. 15 | 2 L glass | 40 | 44.80 | FeSO₄ | 1.50 | Na₂SO₄ | 40 | 0.50 | 0.03 | 34.6 | 1000 | 95 | O₂ | 7 |
| Exmp. 16 | 2 L glass | 40 | 44.80 | FeSO₄ | 1.50 | Na₂SO₄ | 40 | 0.00 | −0.36 | 76.3 | 1000 | 95 | O₂ | 7 |
| Comp. Ex. 15 | 2 L glass | 40 | 44.80 | FeSO₄ | 1.50 | CuSO₄ | 40 | 3.00 | 1.91 | | 1000 | 95 | O₂ | 7 |
| Comp. Ex. 16 | 2 L glass | 40 | 44.80 | FeSO₄ | 1.50 | CuSO₄ | 40 | 2.00 | 1.38 | | 1000 | 95 | O₂ | 7 |
| Exmp. 17 | 2 L glass | 40 | 44.80 | FeSO₄ | 1.50 | CuSO₄ | 40 | 1.00 | 0.07 | 0.0 | 1000 | 95 | O₂ | 7 |
| Exmp. 18 | 2 L glass | 40 | 44.80 | FeSO₄ | 1.50 | CuSO₄ | 40 | 0.50 | −0.20 | 36.6 | 1000 | 95 | O₂ | 7 |
| Comp. Ex. 17 | 2 L glass | 40 | 44.80 | FeSO₄ | 1.50 | CuSO₄ | 40 | 0.00 | −0.48 | 91.6 | 1000 | 95 | O₂ | 7 |

TABLE 6

| No. | Filterability (L per min. per m²) | Solution Properties and Composition | | | | | | | | Precipitation rate (% based on solution) | | Total solution (m³ per ton As) | As solution (m³ per ton As) |
|---|---|---|---|---|---|---|---|---|---|---|---|---|---|
| | | pH | ORP mV | FA g/L | Cu mg/L | As g/L | Fe g/L | Na g/L | S g/L | As | Fe | | |
| Comp. Ex. 4 | 34.0 | 1.85 | 362 | 3 | | 0.03 | 4.09 | 11.52 | 12.20 | 99.9% | 81.7% | 50 | 50 |
| Exmp. 4 | 908.4 | 0.58 | 432 | 21 | | 0.09 | 8.23 | 2.51 | 13.47 | 99.5% | 63.2% | 50 | 50 |
| Exmp. 5 | 1211.2 | 0.35 | 383 | 24 | | 1.11 | 8.54 | | 12.40 | 94.5% | 61.8% | 53 | 53 |
| Exmp. 6 | 1211.2 | 0.24 | 386 | 35 | | 2.19 | 9.65 | | 16.16 | 89.0% | 56.9% | 56 | 56 |
| Exmp. 6-2 | 1211.2 | 0.06 | 379 | 60 | | 7.02 | 13.25 | | 25.27 | 64.9% | 40.8% | 77 | 77 |
| Comp. Ex. 6 | 1211.2 | −0.07 | 449 | 74 | | 13.76 | 18.24 | | 29.97 | 31.2% | 18.4% | 160 | 160 |
| Comp. Ex. 7 | 5.6 | 2.12 | 344 | 2 | | 0.02 | 4.04 | 52.25 | 40.44 | 99.9% | 81.9% | 50 | 50 |
| Exmp. 7 | 1211.2 | 0.98 | 436 | 29 | | 0.23 | 8.25 | 44.75 | 45.12 | 98.9% | 63.1% | 51 | 51 |
| Exmp. 8 | 1211.2 | 0.59 | 439 | 48 | | 0.45 | 8.01 | 42.40 | 49.75 | 97.8% | 64.2% | 51 | 51 |
| Exmp. 9 | 201.9 | 0.24 | 426 | 72 | | 1.24 | 7.92 | 39.44 | 55.91 | 93.8% | 64.6% | 53 | 53 |
| Comp. Ex. 9 | 1211.2 | −0.22 | 463 | 129 | | 19.70 | 23.10 | 41.11 | 77.49 | 1.5% | −3.3% | 3333 | 3333 |
| Comp. Ex. 10 | 3.1 | 2.03 | 377 | 1 | | 0.04 | 6.13 | 58.30 | 46.11 | 99.9% | 81.7% | 33 | 33 |
| Comp. Ex. 11 | | | | | | | | | | | | | |
| Exmp. 10 | 908.4 | 0.75 | 442 | 38 | | 0.40 | 12.56 | 44.27 | 50.80 | 98.7% | 62.5% | 34 | 34 |
| Exmp. 11 | 1211.2 | 0.44 | 457 | 56 | | 0.63 | 12.62 | 43.36 | 56.66 | 97.9% | 62.3% | 34 | 34 |
| Exmp. 12 | 1211.2 | 0.06 | 457 | 81 | | 1.52 | 12.33 | 39.83 | 63.10 | 94.9% | 63.2% | 35 | 35 |
| Exmp. 13 | 1211.2 | −0.40 | 469 | 126 | | 4.97 | 15.17 | 41.89 | 78.48 | 83.4% | 54.7% | 40 | 40 |
| Comp. Ex. 12 | | | | | | | | | | | | | |
| Comp. Ex. 13 | | | | | | | | | | | | | |
| Comp. Ex. 14 | | | | | | | | | | | | | |
| Exmp. 14 | 1211.2 | 0.32 | 465 | 58 | | 0.78 | 15.78 | 36.48 | 54.52 | 98.0% | 64.7% | 25 | 25 |
| Exmp. 15 | 1211.2 | 0.03 | 471 | 87 | | 1.20 | 16.24 | 38.54 | 66.09 | 97.0% | 63.7% | 26 | 26 |
| Exmp. 16 | 201.9 | −0.36 | 468 | 126 | | 4.49 | 17.93 | 38.73 | 77.60 | 88.8% | 59.9% | 28 | 28 |
| Comp. Ex. 15 | 0.5 | 1.91 | 449 | 0 | 33 | 0.06 | 2.06 | 33.71 | 40.61 | 99.9% | 95.4% | 25 | 25 |
| Comp. Ex. 16 | 0.5 | 1.38 | 469 | 7 | 35681 | 1.04 | 11.88 | 24.50 | 45.88 | 97.4% | 73.4% | 26 | 26 |
| Exmp. 17 | 605.6 | 0.07 | 517 | 49 | 41505 | 1.09 | 19.12 | | 49.93 | 97.3% | 57.2% | 26 | 26 |
| Exmp. 18 | 80.7 | −0.20 | 526 | 70 | 41147 | 1.93 | 18.07 | | 55.87 | 95.2% | 59.6% | 26 | 26 |
| Comp. Ex. 17 | 1211.2 | −0.48 | 531 | 140 | 41790 | 40.67 | 47.20 | | 75.19 | −1.7% | −5.5% | | |

TABLE 7

| No. | Solids wet (g/L) | Moist. (WB %) | Cu ppm | Solids Grade As % | Solids Grade Fe % | Na ppm | S ppm | Fe:As (Molar ratio) | Yield (WT per ton AS) | Elution conc. (mg/L) | Part. size dist. Ave (μm) | Part. size dist. 5 μm rate (%) | BET (m²/g) | Specific grav. (g/cc) | Compressed conc. (g/cc) | XRD |
|---|---|---|---|---|---|---|---|---|---|---|---|---|---|---|---|---|
| Comp. Ex. 4 | 309.5 | 77.63 | | 27.25 | 25.73 | 16192 | 15400 | 1.27 | 16.40 | 5.77 | 10.20 | 39.1% | 104.02 | 5.32 | 1.41 | Amorphous |
| Exmp. 4 | 68.9 | 12.26 | | 31.78 | 24.50 | 57 | 2600 | 1.03 | 3.59 | <0.01 | 9.73 | 22.9% | 0.86 | 3.41 | 2.03 | Crystal |
| Exmp. 5 | 63.3 | 11.74 | | 32.11 | 23.85 | 36 | 2500 | 1.00 | 3.53 | 0.09 | 18.60 | 0.0% | 0.20 | 3.27 | 2.05 | Crystal |
| Exmp. 6 | 54.7 | 8.05 | | 31.89 | 23.66 | 44 | 2900 | 1.00 | 3.41 | 0.37 | 16.61 | 0.0% | 0.19 | 3.26 | 2.05 | Crystal |
| Exmp. 6-2 | 39.4 | 8.95 | | 31.23 | 24.18 | 93 | 7300 | 1.04 | 3.52 | 0.47 | 16.97 | 1.1% | 0.15 | 3.12 | 2.03 | Crystal |
| Comp. Ex. 6 | 15.8 | 5.34 | | 30.73 | 23.51 | 26 | 8800 | 1.03 | 3.44 | | 13.71 | 2.2% | 0.18 | 3.15 | 2.01 | Crystal |
| Comp. Ex. 7 | 352.3 | 79.67 | | 25.98 | 24.97 | 28924 | 23900 | 1.29 | 18.93 | 2.34 | 58.79 | 8.7% | 80.94 | 4.65 | 1.45 | Amorphous |
| Exmp. 7 | 63.3 | 6.65 | | 31.23 | 23.68 | 796 | 4200 | 1.02 | 3.43 | 0.04 | 13.88 | 0.7% | 0.22 | 3.30 | 2.04 | Crystal |
| Exmp. 8 | 63.4 | 7.71 | | 31.07 | 23.86 | 725 | 6000 | 1.03 | 3.49 | 0.11 | 17.04 | 0.0% | 0.21 | 3.30 | 2.08 | Crystal |
| Exmp. 9 | 66.7 | 10.18 | | 30.13 | 23.73 | 2307 | 13800 | 1.06 | 3.70 | 0.48 | 12.83 | 43.3% | 0.97 | 3.22 | 2.37 | Crystal |
| Comp. Ex. 9 | | | | 29.80 | 23.11 | 3190 | 16300 | 1.04 | | | 12.00 | 2.5% | 0.25 | なし | なし | Crystal |
| Comp. Ex. 10 | 477.8 | 67.03 | | 18.16 | 17.22 | 26778 | 19800 | 1.27 | 16.70 | 0.63 | 70.10 | 6.2% | 5.51 | 1.98 | 1.85 | Amorphous |
| Comp. Ex. 11 | | | | | | | | | | 1502 | 124.40 | 1.3% | 0.21 | 2.87 | 2.26 | Amorphous |
| Exmp. 10 | 95.7 | 8.23 | | 31.45 | 24.69 | 444 | 6200 | 1.05 | 3.46 | 0.02 | 13.68 | 4.8% | 0.38 | 3.35 | 2.10 | Crystal |
| Exmp. 11 | 96.4 | 7.26 | | 30.39 | 24.81 | 619 | 7500 | 1.10 | 3.55 | 0.07 | 19.21 | 2.2% | 0.20 | 3.29 | 2.11 | Crystal |
| Exmp. 12 | 98.8 | 9.95 | | 31.04 | 24.39 | 703 | 8200 | 1.05 | 3.58 | 0.26 | 19.58 | 0.0% | 0.18 | 3.39 | 2.13 | Crystal |
| Exmp. 13 | 86.6 | 7.38 | | 29.70 | 23.91 | 1713 | 15600 | 1.08 | 3.64 | 0.79 | 10.57 | 4.8% | 0.36 | 3.23 | 2.01 | Crystal |
| Comp. Ex. 12 | | | | | | | | | | | | | | | | |
| Comp. Ex. 13 | | | | | | | | | | | | | | | | |
| Comp. Ex. 14 | | | | | | | | | | | | | | | | |
| Exmp. 14 | 127.8 | 6.33 | | 31.59 | 24.68 | 516 | 3800 | 0.00 | 3.38 | 0.04 | 17.47 | 0.0% | 0.23 | 3.31 | 2.01 | Crystal |
| Exmp. 15 | 128.3 | 6.39 | | 30.81 | 24.28 | 569 | 6500 | 0.00 | 3.47 | 0.07 | 20.30 | 9.5% | 0.27 | 3.29 | 2.24 | Crystal |
| Exmp. 16 | 118.7 | 4.60 | | 29.46 | 24.07 | 2102 | 15400 | 0.00 | 3.56 | 0.35 | 6.51 | 33.4% | 0.47 | 3.23 | 2.14 | Crystal |
| Comp. Ex. 15 | 423.2 | 53.97 | 55376 | 21.30 | 23.17 | 12160 | 35750 | 1.46 | 10.20 | | 36.06 | 10.2% | 93.79 | 4.33 | 1.61 | |
| Comp. Ex. 16 | 368.5 | 59.06 | 48500 | 24.92 | 22.17 | 7972 | 26400 | 1.19 | 9.80 | 2.28 | 39.36 | 9.4% | 84.64 | 4.94 | 1.49 | Amorphous |
| Exmp. 17 | 127.9 | 6.19 | 24000 | 28.84 | 22.41 | | 8800 | 1.04 | 3.70 | 0.02 | 7.91 | 8.8% | 0.43 | 3.41 | 2.01 | Crystal |
| Exmp. 18 | 133.4 | 8.45 | 18700 | 27.54 | 22.71 | | 15100 | 1.11 | 3.97 | 0.09 | 3.59 | 68.7% | 0.85 | 3.24 | 2.25 | Crystal |
| Comp. Ex. 17 | 2.3 | 6.29 | 14000 | 28.42 | 22.41 | | 16442 | 1.06 | 3.75 | | 8.34 | 10.8% | 1.14 | | | Crystal |

TABLE 8

| | pH time course | | | | | | | | ORP time course | | | |
|---|---|---|---|---|---|---|---|---|---|---|---|---|
| No. | 0 Hr | 1 Hr | 2 Hr | 3 Hr | 4 Hr | 5 Hr | 6 Hr | 7 Hr | 0 Hr | 1 Hr | 2 Hr | 3 Hr |
| Comp. Ex. 4 | 4 | 2.39 | 2.17 | 2.07 | 2 | 1.91 | 1.89 | 1.85 | −105 | 278 | 301 | 320 |
| Exmp. 4 | 2 | 0.93 | 0.66 | 0.62 | 0.59 | 0.59 | 0.59 | 0.58 | 123 | 228 | 312 | 350 |
| Exmp. 5 | 1.52 | 0.71 | 0.57 | 0.52 | 0.37 | 0.37 | 0.36 | 0.35 | 198 | 249 | 280 | 308 |
| Exmp. 6 | 1.02 | 0.53 | 0.39 | 0.35 | 0.26 | 0.26 | 0.25 | 0.24 | 250 | 263 | 306 | 326 |
| Exmp. 6-2 | 0.5 | 0.27 | 0.23 | 0.17 | 0.08 | 0.08 | 0.08 | 0.06 | 282 | 377 | 396 | 404 |
| Comp. Ex. 6 | 0 | 0.01 | 0 | −0.07 | −0.07 | −0.07 | −0.07 | −0.07 | 285 | 391 | 411 | 429 |
| Comp. Ex. 7 | 4.02 | 2.78 | 2.39 | 2.28 | 2.22 | 2.15 | 2.13 | 2.12 | −177 | 235 | 284 | 302 |

TABLE 8-continued

| | | | | | | | | | | | | |
|---|---|---|---|---|---|---|---|---|---|---|---|---|
| Exmp. 7 | 1.5 | 1.05 | 0.98 | 0.98 | 0.98 | 0.98 | 0.98 | 0.98 | 192 | 271 | 352 | 392 |
| Exmp. 8 | 1 | 0.68 | 0.59 | 0.59 | 0.59 | 0.59 | 0.59 | 0.59 | 242 | 287 | 344 | 389 |
| Exmp. 9 | 0.5 | 0.3 | 0.3 | 0.3 | 0.3 | 0.26 | 0.24 | 0.24 | 292 | 363 | 399 | 411 |
| Comp. Ex. 9 | 0 | −0.15 | −0.15 | −0.15 | −0.15 | −0.2 | −0.2 | −0.22 | 325 | 402 | 428 | 436 |
| Comp. Ex. 10 | 4.03 | 2.91 | 2.44 | 2.26 | 2.11 | 2.06 | 2.06 | 2.03 | −188 | 204 | 262 | 300 |
| Comp. Ex. 11 | | | | | | | | | | | | |
| Exmp. 10 | 1.51 | 1.08 | 0.99 | 0.79 | 0.79 | 0.78 | 0.77 | 0.75 | 206 | 208 | 242 | 364 |
| Exmp. 11 | 1 | 0.56 | 0.45 | 0.45 | 0.45 | 0.45 | 0.44 | 0.44 | 204 | 269 | 375 | 422 |
| Exmp. 12 | 0.5 | 0.15 | 0.15 | 0.06 | 0.06 | 0.06 | 0.06 | 0.06 | 264 | 330 | 382 | 411 |
| Exmp. 13 | 0 | −0.28 | −0.28 | −0.38 | −0.4 | −0.4 | −0.4 | −0.4 | 303 | 410 | 426 | 436 |
| Comp. Ex. 12 | | | | | | | | | | | | |
| Comp. Ex. 13 | | | | | | | | | | | | |
| Comp. Ex. 14 | 1.39 | 0.92 | | | | | | | 149 | 175 | | |
| Exmp. 14 | 1 | 0.51 | 0.35 | 0.33 | 0.32 | 0.32 | 0.32 | 0.32 | 190 | 217 | 364 | 426 |
| Exmp. 15 | 0.5 | 0.2 | 0.2 | 0.2 | 0.06 | 0.06 | 0.04 | 0.03 | 193 | 318 | 382 | 423 |
| Exmp. 16 | 0 | −0.14 | −0.18 | −0.26 | −0.26 | −0.32 | −0.35 | −0.36 | 234 | 379 | 414 | 431 |
| Comp. Ex. 15 | 3 | 2.14 | 2.08 | 2.05 | 2 | 1.98 | 1.91 | 1.91 | 90 | 403 | 425 | 435 |
| Comp. Ex. 16 | 2 | 1.5 | 1.43 | 1.39 | 1.39 | 1.39 | 1.39 | 1.38 | 83 | 411 | 434 | 446 |
| Exmp. 17 | 1 | 0.4 | 0.15 | 0.15 | 0.11 | 0.07 | 0.07 | 0.07 | 186 | 295 | 460 | 480 |
| Exmp. 18 | 0.5 | 0.04 | 0 | −0.02 | −0.1 | −0.2 | −0.2 | −0.2 | 229 | 396 | 467 | 489 |
| Comp. Ex. 17 | 0 | −0.42 | −0.46 | −0.46 | −0.48 | −0.48 | −0.48 | −0.48 | 283 | 470 | 495 | 504 |

| | ORP time course | | | | Eluted As (mg/L) | Eluted Fe (mg/L) | Eluted S (mg/L) |
|---|---|---|---|---|---|---|---|
| No. | 4 Hr | 5 Hr | 6 Hr | 7 Hr | | | |
| Comp. Ex. 4 | 333 | 339 | 359 | 362 | 5.77 | 65.19 | 452.3 |
| Exmp. 4 | 389 | 412 | 427 | 432 | <0.01 | 3.1 | 3.25 |
| Exmp. 5 | 333 | 356 | 373 | 383 | 0.09 | 0.79 | 50 |
| Exmp. 6 | 347 | 368 | 381 | 386 | 0.37 | 0.78 | <10 |
| Exmp. 6-2 | 393 | 370 | 376 | 379 | 0.47 | 0.33 | <10 |
| Comp. Ex. 6 | 433 | 439 | 449 | 449 | | | |
| Comp. Ex. 7 | 315 | 337 | 343 | 344 | 2.34 | 79.31 | 1268 |
| Exmp. 7 | 410 | 422 | 431 | 436 | 0.04 | 2.31 | 10 |
| Exmp. 8 | 411 | 424 | 433 | 439 | 0.11 | 2.62 | 10 |
| Exmp. 9 | 419 | 423 | 423 | 426 | 0.48 | 5.26 | 20 |
| Comp. Ex. 9 | 445 | 454 | 457 | 463 | | | |
| Comp. Ex. 10 | 330 | 348 | 363 | 377 | 0.63 | 126.2 | 1022 |
| Comp. Ex. 11 | | | | | 1502 | 5162 | 10179 |
| Exmp. 10 | 415 | 429 | 437 | 442 | 0.02 | 3.19 | <10 |
| Exmp. 11 | 440 | 447 | 454 | 457 | 0.07 | 2.64 | <10 |
| Exmp. 12 | 430 | 441 | 452 | 457 | 0.26 | 3.07 | 10 |
| Exmp. 13 | 449 | 457 | 466 | 469 | 0.79 | 2.92 | 10 |
| Comp. Ex. 12 | | | | | | | |
| Comp. Ex. 13 | | | | | | | |
| Comp. Ex. 14 | | | | | | | |
| Exmp. 14 | 443 | 453 | 462 | 465 | 0.04 | 2.15 | <10 |
| Exmp. 15 | 445 | 456 | 466 | 471 | 0.07 | 2.72 | <10 |
| Exmp. 16 | 440 | 453 | 456 | 468 | 0.35 | 2.76 | <10 |
| Comp. Ex. 15 | 440 | 444 | 446 | 449 | | | |
| Comp. Ex. 16 | 454 | 461 | 464 | 469 | 2.28 | 57.92 | 830.3 |
| Exmp. 17 | 500 | 505 | 512 | 517 | 0.02 | 3.09 | <10 |
| Exmp. 18 | 505 | 515 | 517 | 526 | 0.09 | 6.43 | <10 |
| Comp. Ex. 17 | 517 | 519 | 526 | 531 | | | |

What is claimed is:

1. A method of producing an iron-arsenic compound by adding an oxidizing agent to an aqueous solution containing arsenic ions and bivalent iron ions and allowing an iron-arsenic compound precipitation reaction to proceed under stirring of the solution, wherein the oxidizing agent, which is oxygen gas or air, is added to the solution under blowing or bubbling continuously or intermittently and the precipitation reaction is proceeded under stirring of the solution at a temperature from 50° C. up to 100° C. in an open tank under atmospheric pressure and is terminated at a solution pH in the range of 0 to 1.2.

2. A method of producing an iron-arsenic compound by adding an oxidizing agent to an aqueous solution containing arsenic ions and bivalent iron ions and having an arsenic concentration of not less than 15 g/L, and allowing an iron-arsenic compound precipitation reaction to proceed under stirring of the solution, wherein the oxidizing agent, which is oxygen gas or air, is added to the solution under blowing or bubbling continuously or intermittently and the precipitation reaction is proceeded under stirring of the solution at a temperature from 50° C. up to 100 ° C. in an open tank under atmospheric pressure and is terminated at a solution pH in the range of 0 to 1.2.

3. A method of producing an iron-arsenic compound by adding an oxidizing agent to an aqueous solution containing arsenic ions and bivalent iron ions and having an arsenic concentration of not less than 25 g/L, and allowing an iron-arsenic compound precipitation reaction to proceed under stirring of the solution, wherein the oxidizing agent, which is oxygen gas or air, is added to the solution under blowing or bubbling continuously or intermittently and the precipitation reaction is proceeded conducted under stirring of the solution at a temperature from 50° C. up to 100° C. in an open tank under atmospheric pressure and is terminated at a solution pH in the range of − (minus) 0.45 to 1.2.

4. A method of producing an iron-arsenic compound according to claim 1, wherein the pH of the solution before the start of precipitation reaction is greater than 0 and not greater than 2.0.

5. A method of producing an iron-arsenic compound according to claim 1, wherein a ferrous sulfate is used as the source of the bivalent iron ions.

6. A method of producing an iron-arsenic compound according to claim 1, wherein the solution before the start of precipitation reaction contains one or more of sodium, potassium, copper, zinc, manganese and magnesium at a total concentration of 1 to 150 g/L.

7. A method of producing an iron-arsenic compound by adding an oxidizing agent to an aqueous solution containing arsenic ions and bivalent iron ions and precipitating an iron-arsenic compound, which method comprises keeping the pH of the solution before the start of the precipitation reaction (pre-reaction pH) to greater than 0, adding the oxidizing agent to the solution and allowing the precipitation reaction to proceed under stirring of the solution, and controlling the pH to make the final pH of the solution in the stirred state after termination of the precipitation reaction (post-reaction pH) not greater than 1.2, wherein the oxidizing agent is oxygen gas or air and is added to the solution under blowing or bubbling continuously or intermittently, and the precipitation reaction is proceeded under stirring of the solution at a temperature from 50° C. up to 100° C. in an open tank under atmospheric pressure.

8. A method of producing an iron arsenic compound according to claim 2, wherein the pH of the solution before the start of precipitation reaction is greater than 0 and not greater than 2.0.

9. A method of producing an iron arsenic compound according to claim 2, wherein a ferrous sulfate is used as the source of the bivalent iron ions.

10. A method of producing an iron-arsenic compound according to claim 2, wherein the solution before the start of precipitation reaction contains one or more of sodium, potassium, copper, zinc, manganese and magnesium at a total concentration of 1 to 150 g/L.

11. A method of producing an iron-arsenic compound according to claim 3, wherein the pH of the solution before the start of precipitation reaction is greater than 0 and not greater than 2.0.

12. A method of producing an iron-arsenic compound according to claim 3, wherein a ferrous sulfate is used as the source of the bivalent iron ions.

13. A method of producing an iron-arsenic compound according to claim 3, wherein the solution before the start of precipitation reaction contains one or more of sodium, potassium, copper, zinc, manganese and magnesium at a total concentration of 1 to 150 g/L.

* * * * *